(12) United States Patent
Miyatani et al.

(10) Patent No.: US 10,939,081 B2
(45) Date of Patent: Mar. 2, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Sonoko Miyatani, Tokyo (JP); Nozomu Kasuya, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/417,751

(22) Filed: May 21, 2019

(65) Prior Publication Data
US 2019/0364253 A1 Nov. 28, 2019

(30) Foreign Application Priority Data

May 25, 2018 (JP) .............................. JP2018-100808
May 25, 2018 (JP) .............................. JP2018-100809

(51) Int. Cl.
H04N 9/31 (2006.01)
G06T 7/80 (2017.01)
G06T 7/73 (2017.01)

(52) U.S. Cl.
CPC ............. H04N 9/3185 (2013.01); G06T 7/73 (2017.01); G06T 7/80 (2017.01); H04N 9/3147 (2013.01); H04N 9/3188 (2013.01); G06T 2207/30244 (2013.01)

(58) Field of Classification Search
None
See application file for complete search history.

(56) References Cited

U.S. PATENT DOCUMENTS 8,992,315 B2*   3/2015  Lundback .............. A63D 15/20
                                                        463/1
10,059,002 B2   8/2018  Miyatani et al.
2017/0070711 A1*  3/2017  Grundhofer ......... H04N 9/3182
2017/0109932 A1*  4/2017  Fujimoto ........... G06K 9/00671
2019/0089931 A1*  3/2019  Booth ................. G06K 9/6211
2019/0130216 A1   5/2019  Tomioka et al.

FOREIGN PATENT DOCUMENTS

JP        2013088655 A    5/2013
WO        2013140456 A1   9/2013

* cited by examiner

Primary Examiner — Shadan E Haghani
(74) Attorney, Agent, or Firm — Carter, DeLuca & Farrell LLP

(57) ABSTRACT

An image processing apparatus for processing an image of a projection content to be projected onto a projection target object including a pattern or a figure in a part thereof, including: a positioning unit configured to perform positioning of the image of the projection content and the projection target object with respect to each other; a transformation unit configured to transform the image of the projection content on the basis of the result of the positioning by the positioning unit; and an output unit configured to output the image transformed by the transformation unit to a projection device.

18 Claims, 23 Drawing Sheets

IMAGE PROCESSING APPARATUS, IMAGE PROCESSING METHOD, AND STORAGE MEDIUM

BACKGROUND OF THE INVENTION

Field of the Invention

The present invention relates to a technique for projecting an image onto a projection target object such as a print product.

Description of the Related Art

Heretofore, techniques have been known in which various images are projected from a projection device onto a print product such as a poster to change the appearance of the print product and/or to additionally display information. International Publication No. 2013/140456 (hereinafter referred to as Document 1) proposes a technique in which an image obtained by adjusting the pixel values of image data of an actual picture is projected from a projection device onto the actual picture to increase the picture's contrast. Also, Japanese Patent Laid-Open No. 2013-88655 (hereinafter referred to as Document 2) proposes a method in which an actual picture is defined as a display target object and an image of a content is projected from a projection device onto a predetermined region in the actual picture.

In Document 1, the installation position of the projection device needs to be adjusted such that the projected image properly lies on the picture. In Document 2, to project an image of a content onto a predetermined region in the actual picture, the user needs to prepare in advance an image for the size of the predetermined region. Moreover, to project and superimpose the image of the content such that the image coincides with the predetermined region, the user needs to perform manual positioning of the picture and the projection device with respect to each other, such as adjusting the installation position of the projection device, and the positioning work is cumbersome.

SUMMARY OF THE INVENTION

An image processing apparatus according to an aspect of the present invention is an image processing apparatus for processing an image of a projection content to be projected from a projection device onto a projection target object including a pattern or a figure in a part thereof, comprising: a positioning unit configured to perform positioning of the image of the projection content and the projection target object with respect to each other; a transformation unit configured to transform the image of the projection content on a basis of a result of the positioning by the positioning unit; and an output unit configured to output the image transformed by the transformation unit to the projection device.

Further features of the present invention will become apparent from the following description of exemplary embodiments with reference to the attached drawings.

DESCRIPTION OF THE EMBODIMENTS

Embodiments of the present invention will be described below with reference to the drawings. Note that the following embodiments do not limit the present invention, and not all the combinations of the features described in these embodiments are necessarily essential for a solution provided by the present invention. Meanwhile, the description will be given with the same reference sign given to identical components.

Embodiment 1

Figure 1:
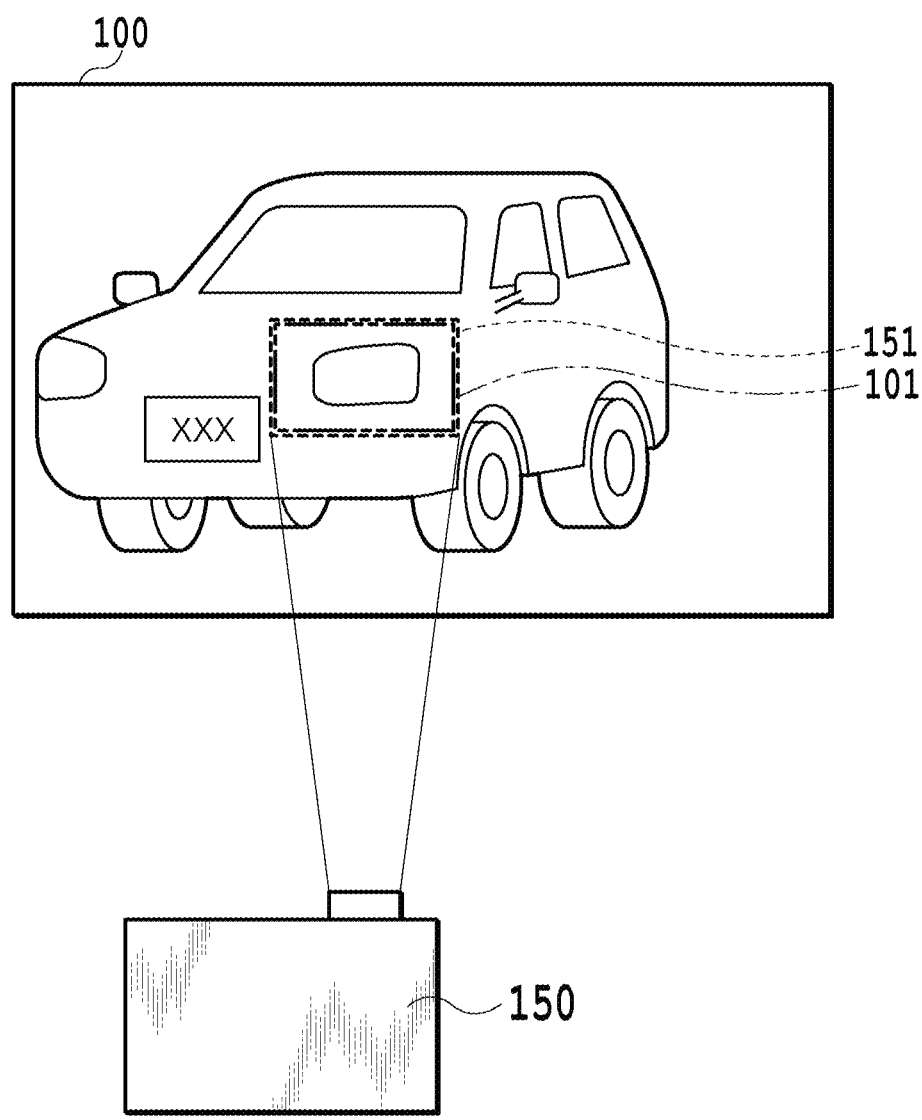
FIG. 1 is a diagram explaining an overview of an image projection system.

FIG. 1 is a diagram explaining an overview of an image projection system in the present embodiment. The present embodiment will be described using a print product 100 such as a poster attached to a wall or the like as an example of a projection target object. A projection device projects an image of a projection content (hereinafter referred to as "projection content image") onto a region in the image on the print product 100 (hereinafter referred to as "partial region"). As a result, the projection content image is presented superimposed on a projection region 151 corresponding to a partial region 101 in the print product 100.

The present embodiment will be described taking as an example a case where the image printed on the print product 100 (hereinafter referred to as "content image") and the projection content image are images of the same size (resolution). Specifically, a print product is produced by causing a printer to output a content image, and a projection content image is generated by causing the projection device to output the content image used to produce the print product. For example, the content image printed on the print product 100 and the projection content image are images of the same vehicle, and a partial region 101 in the image on the print product 100 is a region including a headlamp. Assume a situation where the user wishes to change the appearance of the print product 100 by projecting a projection image having increased luminance at a headlamp portion from a projection device 150. In this case, a region including the partial region 101 is used as a projection region 151 instead of using the entire print product 100 as the projection region. In this way, the luminance of the partial region 101 is high as compared to the case where the entire print product 100 is used as the projection region.

First, a description will be given of an approach, as a comparative example, in which the user prepares a projection image for a partial region and manually adjusts the installation position of the projection device 150 to increase the luminance of the headlamp portion. From the projection content image (the image of the entire vehicle), the user clips the partial region 101 around the headlamp to prepare image data to be projected. The user then projects the prepared image data to be projected from the projection device 150. While projecting the clipped image data to be projected from the projection device 150, the user manually adjusts the installation position of the projection device 150 or the like such that the projected image accurately coincides with the position on the print product corresponding to the clipped partial region 101. Such adjustment is troublesome for the user. Moreover, it is difficult to accurately position the projected image. Furthermore, in a case where the relative positions of the print product 100 and the projection device 150 is changed after the adjustment, the user has to do troublesome work again such as preparation of image data to be projected for the changed position and/or manual adjustment of the installation position of the projection device 150. In the following embodiment, a description will be given of a mode in which an image processing apparatus generates a projection image suitable for the partial region 101 in the print product 100 and the projection device 150 projects the generated projection image, thereby causing no such troublesome work.

Note that the shape of the print product 100 is not limited to a rectangle but may be any shape as long as it is flat. For example, it may be a shape such as a rhombus, a trapezoid, a circle, or a triangle. Also, although the print product 100 is presented here as an example of the projection target object, it may be a fabric product such as a curtain or a piece of clothing.

<Description of Configuration>

Figure 2:
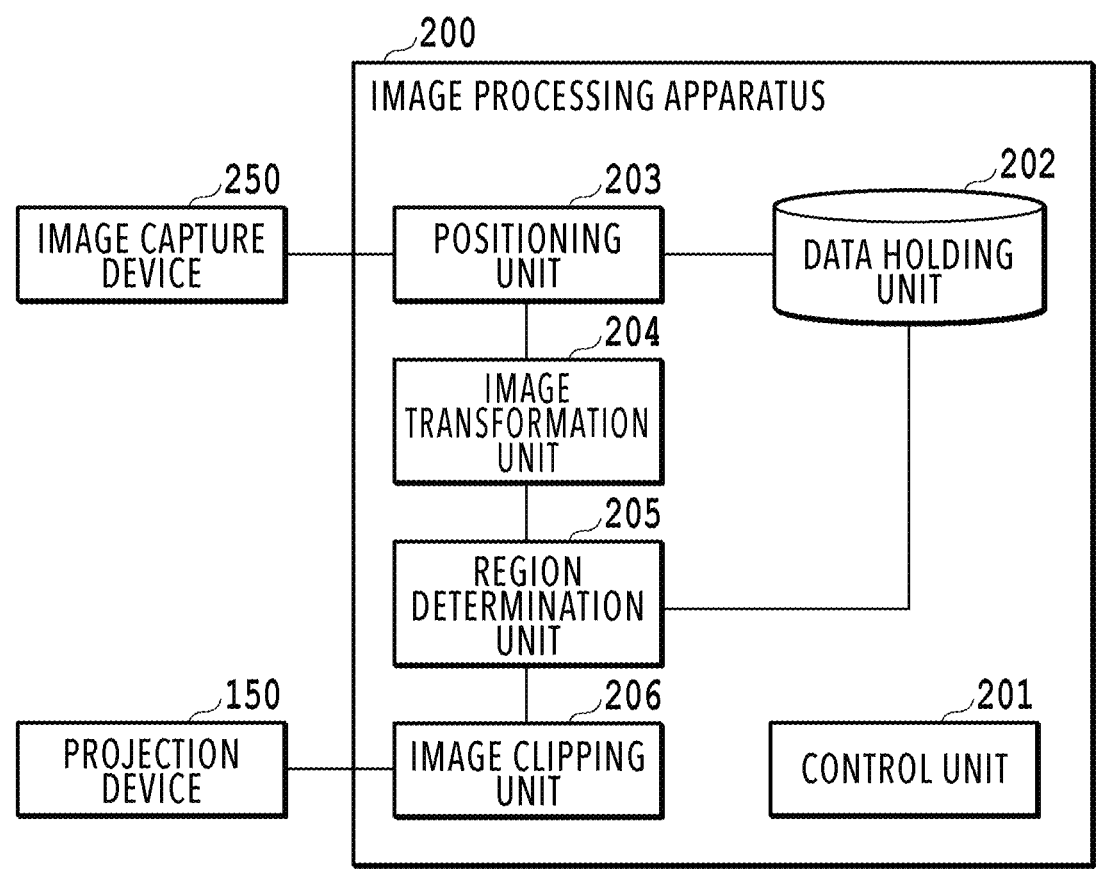
FIG. 2 is a block diagram illustrating an example of the functional configuration of the image projection system.

FIG. 2 is a block diagram illustrating an example of the functional configuration of the image projection system in the present embodiment. As illustrated in FIG. 2, the image projection system according to the present embodiment comprises an image capture device 250, the projection device 150, and an image processing apparatus 200.

The image capture device 250 is disposed such that the print product 100 is included within its angle of view. The image capture device 250 captures an image of the print product 100. The image capture device 250 also captures a positioning pattern image projected from the projection device 150. Note that the image capture device 250 does not necessarily have to be disposed such that the entire print product is included within its angle of view. It suffices that at least the projection region 151 on the print product 100 is included within the angle of view.

The projection device 150 projects an image of a projection content held in a data holding unit 202 in the image processing apparatus 200 onto the print product 100. The projection device 150 is disposed such that the partial region 101 in the image on the print product 100 is included in the projection region 151. Note that in the present embodiment, the user does not need to accurately adjust the installation position the projection device 150. The projection device 150 may only need to be disposed such that a partial region in the image on the print product 100 is included in the projection region 151. That is, in the example of FIG. 1, the projection device 150 may only need to be disposed such that a region in the image on the print product 100 around a headlamp of the vehicle is included in the projection region 151. Furthermore, the projection device 150 does not have to be installed such that the headlamp, which is the target of the projection and the superimposition, is substantially centered on the projection region 151. The projection device 150 may be installed such that the headlamp, which is the target of the projection and the superimposition, is offset toward either side from the center the projection region 151. The projection device 150 may only need to be roughly positioned and disposed such that the partial region 101 in the print product 100, which is the target of the projection and the superimposition, is included in the projection region 151. In the example described here, the installation position of the projection device 150 is adjusted. Note however that the above points similarly apply to a mode in which the projection device 150 is fixed and the position of the print product 100 is adjusted.

The image processing apparatus 200 is an information processing apparatus such for example as a computer and comprises a control unit 201, the data holding unit 202, a positioning unit 203, an image transformation unit 204, a region determination unit 205, and an image clipping unit 206.

The control unit 201 controls the entire processing in the image processing apparatus 200. The control unit 201 is capable of controlling the projection process in the projection device 150 and the image capture process in the image capture device 250. The present embodiment will be described taking as an example a mode in which the control unit 201 of the image processing apparatus 200 controls the projection device 150 and the image capture device 250. However, control apparatuses that individually control the projection device 150 and the image capture device 250 may be provided.

The data holding unit 202 holds various pieces of data and information. For example, the data holding unit 202 holds image data corresponding to the content image on the print product 100 (hereinafter referred to as "content image data"). The data holding unit 202 also holds image data of the projection content to be projected from the projection device 150 (hereinafter referred to as "projection content image data"). In the present embodiment, the projection content image is an image associated with the content image on the print product 100. For example, the content image on the print product 100 and the projection content image are images of the same scene. The images of the same scene include an image after predetermined image processing. For example, one may be an image after contrast correction and the other may be an image with no contrast correction. Alternatively, one may be an image after a noise reduction process and the other may be an image with no noise reduction process. The content image on the print product 100 and the projection content image may only need to be of the same image size and may be different images. The content image on the print product 100 is used in later-described positioning with respect to the projection content image. The data holding unit 202 also holds projection region information. The projection region information is the value of the resolution of the projection device 150, for example.

The positioning unit 203 estimates the positional relation between the print product 100 and the image capture device 250 and the positional relation between the image capture device 250 and the projection device 150. Details of this process will be described later.

The image transformation unit 204 transforms the projection content image on the basis of the positional relations determined by the positioning unit 203. First, the image transformation unit 204 converts the content image in the content-image coordinate system into an image in a camera coordinate system on the basis of the positional relation between the print product 100 and the image capture device 250 estimated by the positioning unit 203. Further, the image transformation unit 204 converts the content image in the camera coordinate system into an image in a projector coordinate system 531 on the basis of the positional relation between the image capture device 250 and the projection device 150. As a result, the content image is transformed. Details of this process will be described later.

The region determination unit 205 determines the region to be projected from the projection device 150 in the transformed content image in the projector coordinate system on the basis of the projection region information. Details of this process will be described later.

The image clipping unit 206 clips a partial image of the region determined by the region determination unit 205 in the transformed content image in the projector coordinate system. The clipped partial image is projected as a projection image from the projection device 150. Specifically, the control unit 201 controls the projection device 150 to cause the projection device 150 to project the partial image clipped by the image clipping unit 206 as a projection image. Note that the clipped partial image is a part of the projection content image transformed on the basis of the positional relations. Thus, when projected from the projection device 150, the projection image is projected superimposed on a predetermined region in the image on the print product 100 in a state where the projection image is accurately positioned with respect to the predetermined region.

Figure 3:
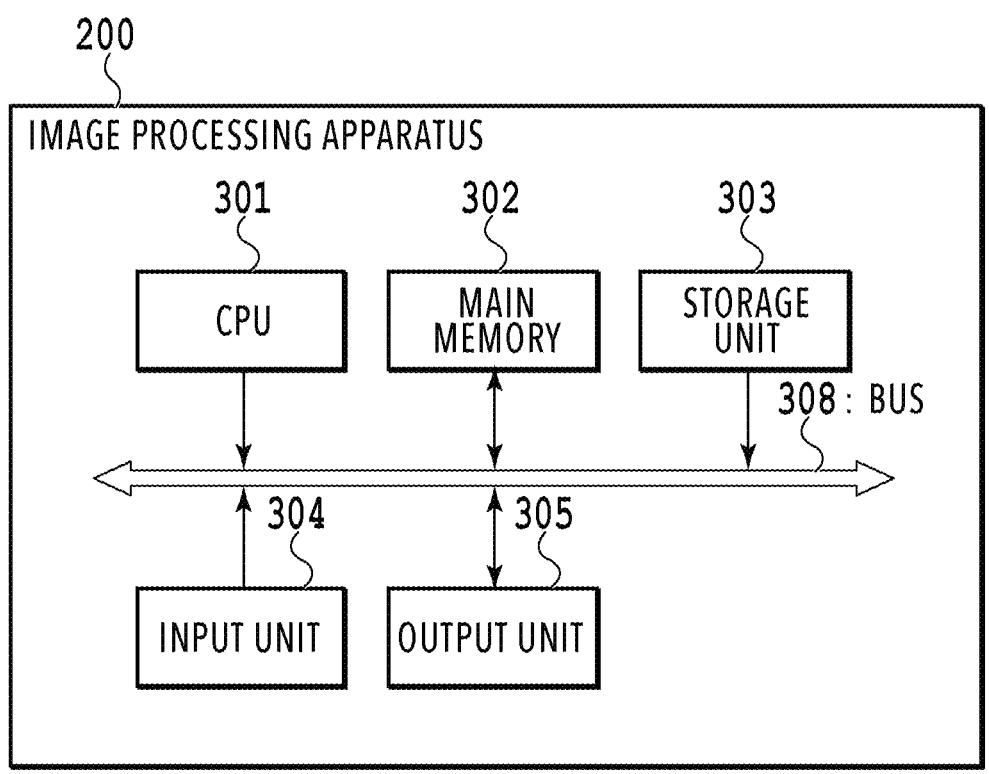
FIG. 3 is a diagram illustrating an example of the hardware configuration of an image processing apparatus.

FIG. 3 is a diagram illustrating an example of the hardware configuration of the image processing apparatus 200. The image processing apparatus 200 illustrated in FIG. 3 comprises a CPU 301, a main memory 302, a storage unit 303, an input unit 304, and an output unit 305, and these components are connected to each other through a bus 308. The CPU 301 is an arithmetic processing device that takes overall control of the image processing apparatus 200 and performs various processes by executing various programs stored in the storage unit 303 of the like. The main memory 302 temporarily stores data, parameters, and so on to be used in various processes and also provides a work area to the CPU 301. The storage unit 303 is a high-capacity storage device that stores various programs and various pieces of data. A non-volatile memory, e.g. a hard disk drive, a silicon disk, or the like is used as the storage unit 303. The input unit 304 receives image data captured by the image capture device 250, the image data on the content image on the print product 100, and the like. The input unit 304 also receives various user instructions. The output unit 305 outputs the image data of the projection image to the projection device 150 and also outputs various control commands to the projection device 150 and the image capture device 250. The data holding unit 202 of the image processing apparatus 200 illustrated in FIG. 2 corresponds to the storage unit 303. The CPU 301 can implement some or all of the other units in the image processing apparatus 200 illustrated in FIG. 2 by deploying a program stored in the storage unit 303 to the main memory 302 and executing it. Alternatively, some or all of the units may be implemented with dedicated hardware.

<Flowchart>

Figure 4:
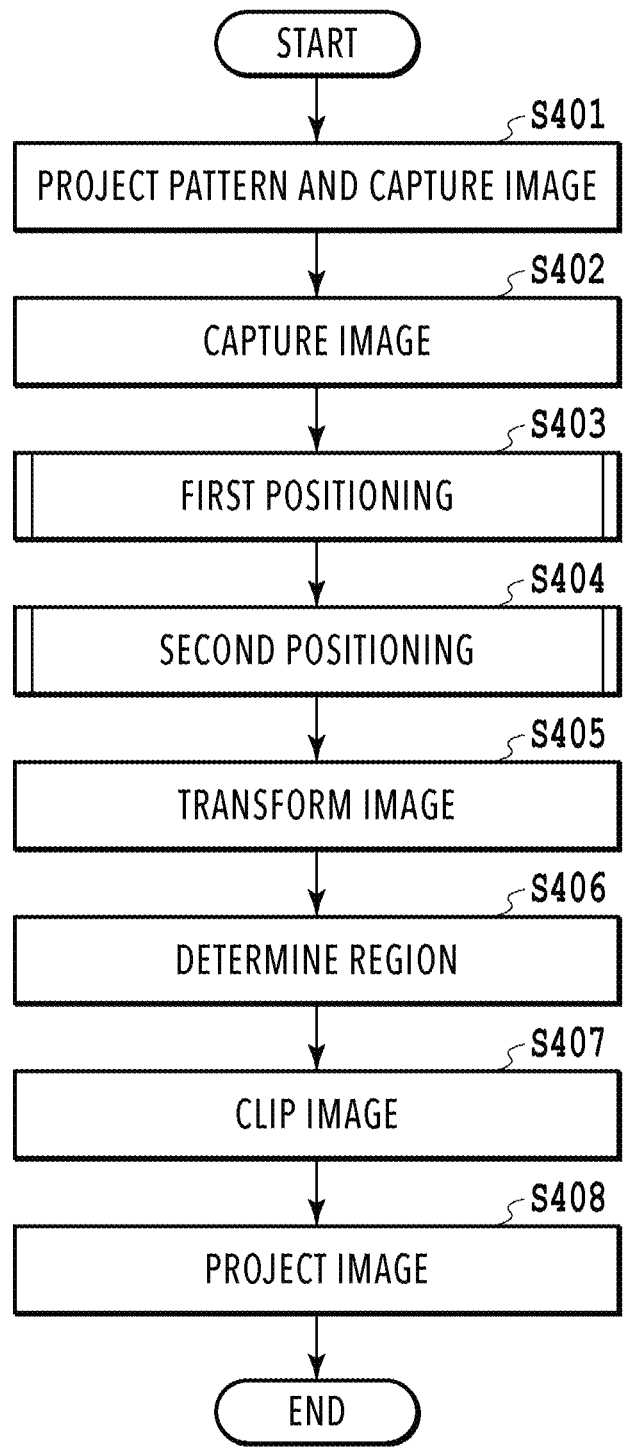
FIG. 4 is a flowchart illustrating an example of an entire process.

FIG. 4 is a flowchart illustrating an example of the entire process performed by the image processing apparatus 200 according to the present embodiment. The CPU 301 performs the series of processes illustrated in the flowchart of FIG. 4 by deploying program code stored in the storage unit 303 to the main memory 302 and executing it. Alternatively, the functions of some or all of the steps in FIG. 4 may be implemented with hardware such as an ASIC or an electronic circuit. Meanwhile, the symbol "S" in the description of each process means a step in the flowchart.

In S401, the control unit 201 controls the projection device 150 to project a positioning pattern from the projection device 150 onto the print product 100. The control unit 201 also controls the image capture device 250 to capture an image of the print product 100 with the positioning pattern projected thereon. A Gray code pattern, for example, can be used as the positioning pattern. A Gray code is a black-and-white pattern image. The position can be estimated by projecting a plurality of pattern images with different patterns. Note that the positioning pattern may be any pattern as long as an identifiable feature or coordinate values can be extracted from an image of a projection surface captured with the pattern projected thereon. For example, the positioning pattern may be a random dot pattern.

In S402, the control unit 201 controls the image capture device 250 to capture an image of the print product 100 with no pattern projected thereon. Note that the control unit 201 may cause the projection device 150 to project white light or gray light onto the print product 100 when the image capture device 250 captures an image of the print product 100. This prevents the print product 100 from appearing dark in the captured image data. Also, in a case where the content image data and the captured image data differ in color, the control unit 201 may control the projection device 150 to perform such a projection that both have identical or similar colors.

In S403, the positioning unit 203 performs a first positioning process that estimates the positional relation between the print product 100 and the image capture device 250. Specifically, using the captured image of the print product 100 with no pattern projected thereon, obtained by the image capture in S402, and the content image on the print product 100 held in the data holding unit 202, the positioning unit 203 estimates a homography Ha between the print product 100 and the image capture device 250. A homography represents a projective transformation that maps a plane into another plane. Details of this process will be described later.

In S404, the positioning unit 203 performs a second positioning process that estimates the positional relation between the image capture device 250 and the projection device 150. Specifically, using the captured image of the print product 100 with the pattern projected thereon, obtained by the image capture in S401, and the pattern projected in S401, the positioning unit 203 estimates a homography $H_{pc}$ between the image capture device 250 and the projection device 150. Details of this process will be described later.

In S405, the image transformation unit 204 converts the projection content image held in the data holding unit 202 on the basis of the positional relations obtained by S403 and S404. As mentioned above, the projection content image is an image of the same resolution as the content image on the print product 100. In other words, the coordinate system of the projection content image and the coordinate system of the content image on the print product are the same coordinate system. The image transformation unit 204 performs a process of converting this projection content image into an image in the projector coordinate system. The image transformation unit 204 converts the projection content image into an image in the camera coordinate system by using the homography $H_{ct}$, estimated by the first positioning process in S403. Further, the image transformation unit 204 converts this converted projection content image in the camera coordinate system into an image in the projector coordinate system by using the homography $H_{pc}$, estimated by the second positioning process in S404.

Figure 5:
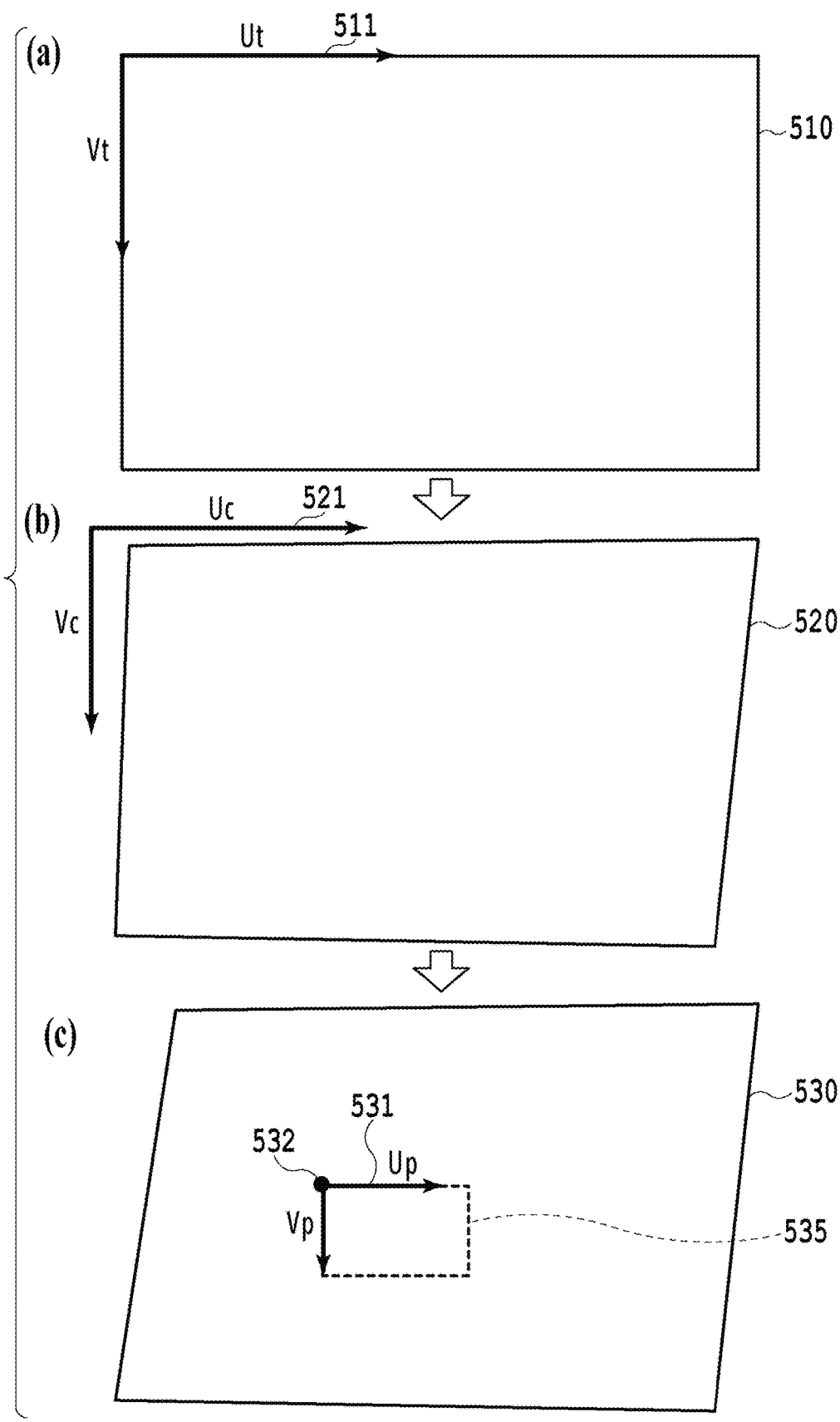
FIG. 5 is a diagram explaining coordinate system conversions.

FIG. 5 is a diagram explaining the coordinate system conversions. (a) in FIG. 5 is a diagram illustrating a projection content image 510. The projection content image 510 and the content image on the print product 100 are images in the same coordinate system (content coordinate system 511). The image transformation unit 204 transforms the projection content image 510 into an image in a camera coordinate system 521 on the basis of the positional relation between the print product 100 and the image capture device 250 estimated by the positioning unit 203. Specifically, the image transformation unit 204 uses the homography Ha between the print product 100 and the image capture device 250. Then, as illustrated in (a) and (b) in FIG. 5, the image transformation unit 204 converts the projection content image 510 from sets of coordinates $(u_t, v_t)$ in the content coordinate system 511 into sets of coordinates $(u_c, v_c)$ in the camera coordinate system 521 by using equation 1. (b) in FIG. 5 illustrates a first transformed image 520 obtained by transforming the projection content image 510 into an image in the camera coordinate system 521.

$$\begin{bmatrix} u_c \\ v_c \\ 1 \end{bmatrix} = H_{ct} \begin{bmatrix} u_t \\ v_t \\ 1 \end{bmatrix} \quad \text{(Equation 1)}$$

The image transformation unit 204 further transforms the first transformed image 520 in the camera coordinate system 521 into an image in a projector coordinate system on the basis of the positional relation between the image capture device 250 and the projection device 150. Specifically, with the homography $H_{pc}$ between the image capture device 250 and the projection device 150, the image transformation unit 204 converts the first transformed image 520 from the sets of coordinates $(u_c, v_c)$ in the camera coordinate system 521 into sets of coordinates $(u_p, v_p)$ in a projector coordinate system 531 by using equation 2, as illustrated in (b) and (c) in FIG. 5. (c) in FIG. 5 illustrates a second transformed image 530 obtained by transforming the first transformed image 520 in the camera coordinate system 521 into an image in the projector coordinate system 531. The projection content image 510 is transformed into an image in the projector coordinate system 531 (second transformed image 530) in this manner.

$$\begin{bmatrix} u_p \\ v_p \\ 1 \end{bmatrix} = H_{pc} \begin{bmatrix} u_c \\ v_c \\ 1 \end{bmatrix} \quad \text{(Equation 2)}$$

In S406, the region determination unit 205 determines the projection region in the transformed projection content image by referring to the projection region information held in the data holding unit 202. Specifically, the region determination unit 205 determines the projection region in the second transformed image 530 in the projector coordinate system 531 on the basis of the projection region information. This will be described using (c) in FIG. 5. The converted projection content image in the projector coordinate system 531 (second transformed image 530) includes a region equivalent to the resolution of the projection device from its origin at a point 532 at the upper left corner of a valid display region for the projection device 150. Also, the projection content image (second transformed image 530) includes negative coordinates in the projector coordinate system 531. Negative coordinates are included because the positional relation between the projection device 150 and the image capture device 250 has been determined on the basis of the captured image data obtained by capturing an image of the print product 100 with the positioning pattern projected on its partial region. The region determination unit 205 determines the region equivalent to the projection region information (resolution in the present embodiment) from the origin 532 as a projection region 535. Specifically, the region determination unit 205 determines the inside of the closed curve linking four sets of coordinates (0, 0), (X-direction resolution −1, 0), (X-direction resolution −1, Y-direction resolution −1), and (0, Y-direction resolution −1) in the projector coordinate system 531 as the projection region 535.

In S407, the image clipping unit 206 clips a partial image from the transformed projection content image (second transformed image 530) on the basis of the projection region 535 determined in S406. In other words, the image clipping unit 206 clips the partial image corresponding to the projection region 535 in the second transformed image 530.

In S408, the control unit 201 controls the projection device 150 to project the partial image clipped in S407 from the projection device 150 onto the print product 100. By the above process, a positioned partial image is projected at the appropriate position on the print product 100.

<Description of Positioning Processes>

Figure 6A:
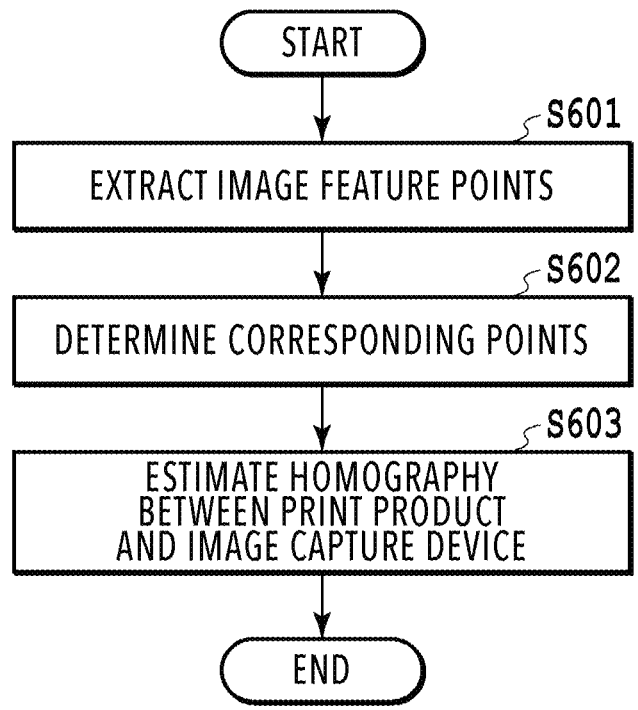
FIGS. 6A and 6B are each a flowchart of a positioning process.

FIG. 6A is a flowchart illustrating details of the first positioning process performed in S403. The process in FIG. 6A is executed by the positioning unit 203. In S601, the positioning unit 203 extracts image feature points from both the content image on the print product 100 held in the data holding unit 202 and the captured image obtained by the image capture in S402. The image feature points extracted here are, for example, A-KAZE features. A-KAZE features are features with which correspondence robust to scaling, rotation, luminance change, and blur are obtainable. Note that the feature points to be extracted are not limited to A-KAZE features but may be any features as long as they are feature points extractable from images.

In S602, the positioning unit 203 determines the correspondence between the image feature points extracted in S601 from the content image on the print product 100 and the captured image. Specifically, the positioning unit 203 performs a full search to check every possible pair of feature points to find a pair that best coincides with each other in A-KAZE feature amount. In S603, the positioning unit 203 estimates the homography between the print product 100 and the image capture device 250 from the correspondence between the image feature points determined in S602. Here, the positioning unit 203 may use a robust estimation such for example as RANSAC or maximum likelihood estimation. Using a robust estimation enables the positioning unit 203 to estimate an accurate homography even in a case where wrong correspondence of feature points is included.

Figure 6B:
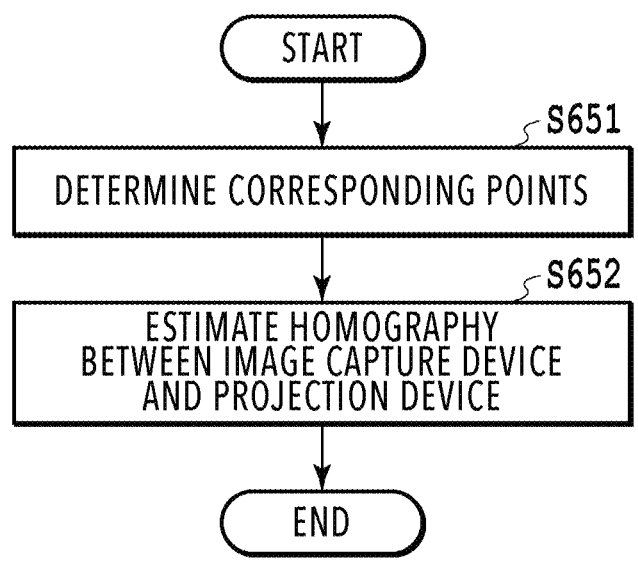

FIG. 6B is a flowchart explaining details of the second positioning process performed in S404. In S651, using the captured image obtained by the image capture in S401, the positioning unit 203 determines corresponding points between the positioning pattern projected by the projection device 150 and the captured image. A Gray code can be used for the positioning pattern. A Gray code pattern for use in positioning is such a pattern that coordinates on a projection device projecting the pattern are uniquely determinable, and can be associated with a captured image of the pattern in one-to-one correspondence. In S652, the positioning unit 203 estimates the homography between the image capture device 250 and the projection device 150 from the corresponding points determined in S651.

In the example described above, image feature points are extracted in S601 from the image captured in S402. However, in a case where image feature points can be extracted from the captured image of the print product with the pattern projected thereon, obtained in S401, image feature points may be extracted from the image captured in S401. In this case, the process in S402 may be omitted.

Also, in the example described above, a method has been described in which the second positioning (S404) is performed after the first positioning (S403). However, the first positioning may be performed after the second positioning. In this case, the positioning pattern does not necessarily have to be projected onto the print product. The print product may be attached after the second positioning is performed, and the first positioning may then be performed. Also, in a case where the arrangement of the projection device and the camera is fixed, the homography between the image capture device 250 and the projection device 150 remains unchanged. Thus, after the second positioning is performed once, its result may be held in the data holding unit 202, and it may be read out of the data holding unit 202 on the next and subsequent occasions.

As discussed above, in the present embodiment, the positional relation between a print product and a projection device is estimated by using an image capture device, and a projection content image is transformed on the basis of the result of the positioning. Then, a partial image in a region of the same resolution as the projection region of the projection device is clipped from the transformed projection content image. By causing the projection device to project the image thus clipped as a projection image, an accurately positioned projection image is projected superimposed onto a partial region in the print product. Thus, according to the present embodiment, it is not necessary to prepare a content image adjusted to the size of a specific projection target region in advance. Moreover, it is possible to spare the user the trouble of having to accurately adjust the installation position of the projection device so as to project the content image onto that region.

<Modification 1>

Embodiment 1 has been described on the assumption that the shape of the print product is flat. However, the shape of the print product may be a curved shape, a recessed and raised shape, or other shapes. In the present modification, a case where the shape of the print product is a non-flat shape will be described. The present modification differs from embodiment 1 in the contents of the first positioning process and the second positioning process. The differences will be mainly described below.

The first positioning process will be described first using FIG. 6A. The processes in S601 and S602 are similar to those described in embodiment 1.

In S603, the positioning unit 203 estimates the homography between the print product 100 and the image capture device 250 from the correspondence between the image feature points extracted from the content image on the print product 100 and the captured image. In the present modification, in doing so, the positioning unit 203 divides one of the content image on the print product 100 and the captured image into a plurality of regions, and estimates the homography for each region by using the correspondence of image feature points present in the region. Even in the case where the shape of the print product is a curved or a recessed and raised shape, dividing it into smaller regions enables each region to be assumed as a flat surface. Hence, it is possible to estimate the homography for each region. As for the method of division into regions, any method may be employed. For example, a grid of a predetermined size may be used to divide the image into regions.

The homography estimation requires at least four corresponding points. For any regions containing less than four corresponding points, the homography is estimated using the correspondence at a surrounding region(s). Note that a different method may be used to estimate the homography for any regions containing less than four corresponding points. For example, known markers or the like may be attached to any regions in the content image on the print product from which no image feature point has been extracted so that feature points can be extracted.

The second positioning process will be described next using FIG. 6B. S651 is similar to that described in embodiment 1. In S652, the positioning unit 203 estimates the homography between the image capture device 250 and the projection device 150. In this step, the positioning unit 203 divides one of the captured image and the positioning pattern (pattern image) into a plurality of regions and, as in S603, estimates the homography for each region by using the correspondence of image feature points present in the region.

By using modification 1, even in the case where the shape of the print product 100 is a non-flat shape such for example as a curved shape or a recessed and raised shape, it is still possible to estimate the positional relation between the print product 100 and the projection device 150 by using the image capture device 250 and transform the projection content image on the basis of the result of the positioning.

<Modification 2>

In the example described in modification 1, the shape of the print product 100 is unknown. In a case where the three-dimensional shape of the print product 100 is known, it is possible to use a model fitting approach in which features obtained from the three-dimensional shape of the print product are fitted to features extracted from a captured image of the print product. Using this approach enables estimation of the relative position and orientation between the print product 100 and the image capture device 250. The projection content image can be transformed on the basis of the estimated position and orientation.

First, an example of the functional configuration of the system according to the present modification will be described using the block diagram in FIG. 2. Since the units other than the data holding unit 202 are similar to those described in embodiment 1, only the data holding unit 202 will be described here.

The data holding unit 202 holds a three-dimensional shape model having the same surface shape as the print product 100. Also, the data holding unit 202 holds: a rough relative position and orientation between the print product and the image capture device; intrinsic parameters of the image capture device and the projection device; the projection content image to be projected from the projection device; and the projection region information. The three-dimensional shape model is a polygon model defined by a plurality of triangles and the relations of connection between them. Note that the three-dimensional shape model may only need to be able to express the surface shape of the print product, and may use a different method to express it. For example, a Brep model, expressed by the shapes of a plurality of surfaces, may be used to express the surface shape of the print product. The rough relative position and orientation between the print product 100 and the image capture device 250 do not have to be an accurate relative position and orientation but may be a distance and angles measured by the user with a tape measure and protractor or the like. Also, a relative position and orientation between the image capture device 250 and the print product 100 obtained by executing the process in the present modification once on the basis of a rough relative position and orientation inputted by the user may be used as the rough relative position and orientation between the image capture device 250 and the print product 100. The intrinsic parameters of the image capture device 250 and the projection device 150 are, for example, the focal lengths and the positions of the principal points of the image capture device 250 and the projection device 150.

Next, the flow of the entire process in the present modification will be described using FIG. 4. Since only the contents of the processes in S403 to S405 differ from those in embodiment 1, only the processes in S403 to S405 will be described below.

In S403, the positioning unit 203 estimates a three-dimensional position and orientation $[R|T]_{ct}$ between the print product 100 and the image capture device 250. The position and orientation $[R|T]_{ct}$ is a transformation matrix, where R represents a matrix of orientation components, and T represents a matrix of horizontal components. Details of this process will be described later.

In S404, the positioning unit 203 estimates a three-dimensional position and orientation $[R|T]_{pc}$ between the image capture device 250 and the projection device 150. Details of this process will be described later.

In S405, the image transformation unit 204 performs a coordinate conversion as described in equation 3 by using the three-dimensional position and orientation $[R|T]_{ct}$ between the print product 100 and the image capture device 250, estimated in S403. Specifically, using the three-dimensional position and orientation $[R|T]_{ct}$, the image transformation unit 204 converts each set of coordinates $(x_t, y_t, z_t)$ in the three-dimensional shape model of the print product 100 into a set of three-dimensional coordinates $(x_c, y_c, z_c)$ in a view from the position of the image capture device 250.

$$w\begin{bmatrix} x_c \\ y_c \\ z_c \\ 1 \end{bmatrix} = [R|T]_{ct} \begin{bmatrix} x_t \\ y_t \\ z_t \\ 1 \end{bmatrix} \quad \text{(Equation 3)}$$

Then, the image transformation unit 204 converts each set of three-dimensional coordinates $(x_c, y_c, z_c)$ in the view from the position of the image capture device 250 as described in equation 4 into a set of coordinates $(u_p, v_p)$ in the projector coordinate system. Specifically, the image transformation unit 204 converts each set of three-dimensional coordinates $(x_c, y_c, z_c)$ into a set of coordinates $(u_p, v_p)$ by using the three-dimensional position and orientation $[R|T]_{pc}$ between the image capture device 250 and the projection device 150 and an intrinsic parameter K of the projection device held in the data holding unit 202. In this way, the projection content image in the coordinate system of the three-dimensional shape model of the print product 100 can be transformed into sets of coordinates in the projector coordinate system.

$$w\begin{bmatrix} u_p \\ v_p \\ 1 \end{bmatrix} = K[R|T]_{pc} \begin{bmatrix} x_c \\ y_c \\ z_c \\ 1 \end{bmatrix} \quad \text{(Equation 4)}$$

Figure 7A:
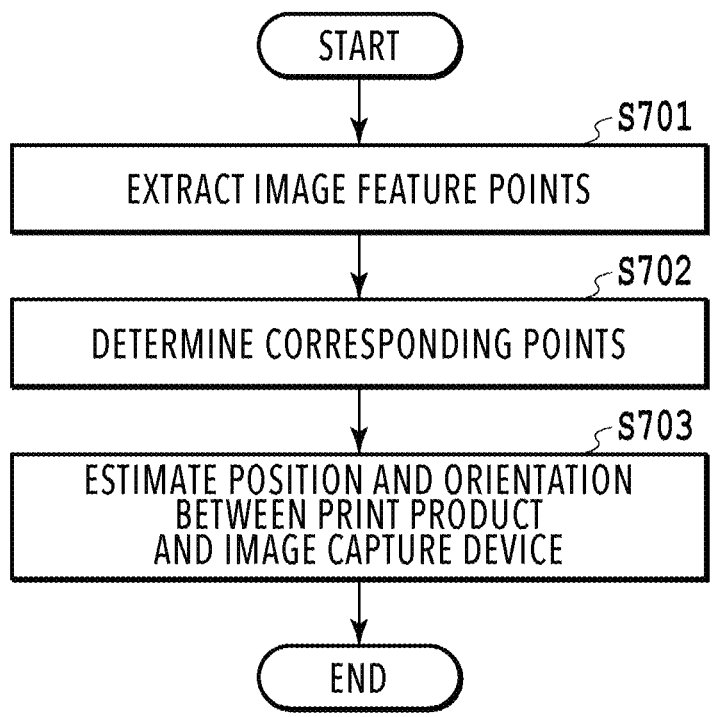
FIGS. 7A and 7B are each a flowchart of a positioning process.

FIG. 7A is a flowchart explaining the first positioning process performed in S403 in the present modification. In S701, the positioning unit 203 extracts three-dimensional edge features from the three-dimensional shape model of the print product 100 in the data holding unit 202. The positioning unit 203 also extracts two-dimensional edge features from the captured image. Note that the features to be extracted are not limited to edge features but may be any features as long as they are features extractable from a three-dimensional shape. For example, the positioning unit 203 may distinguish between roof edges extracted from curved shapes and jump edges extracted from right-angle shapes and extract only the jump edges. Depending on the image capture position, the positions of roof edges may be shifted, but the positions of jump edges are not shifted and therefore are less likely to cause correspondence errors in S702.

In S702, the positioning unit 203 determines the correspondence between the three-dimensional edge features extracted from the three-dimensional shape model and the two-dimensional edge features extracted from the captured image. Specifically, first, on the basis of the rough position and orientation between the print product 100 and the image capture device 250 held in the data holding unit 202, the positioning unit 203 projects the three-dimensional edge features extracted from the three-dimensional shape model onto the captured image to thereby convert the three-dimensional edge features into two-dimensional edge features. Then, for each of the two-dimensional edge features obtained by the projection onto the captured image, the positioning unit 203 searches for the closest two-dimensional edge feature present in the captured image from among the two-dimensional edge features extracted from the capture image, and associates them with each other.

In S703, the positioning unit 203 estimates the position and orientation $[R|T]_{ct}$ between the print product 100 and the image capture device 250 with which the sum of the distances between the associated pairs of edge features is the smallest. The distance between a pair of associated edge features is the sum of the distances from an end point on the two-dimensional edge feature obtained by the projection onto the capture image and the corresponding two-dimensional edge feature extracted from the captured image.

Figure 7B:
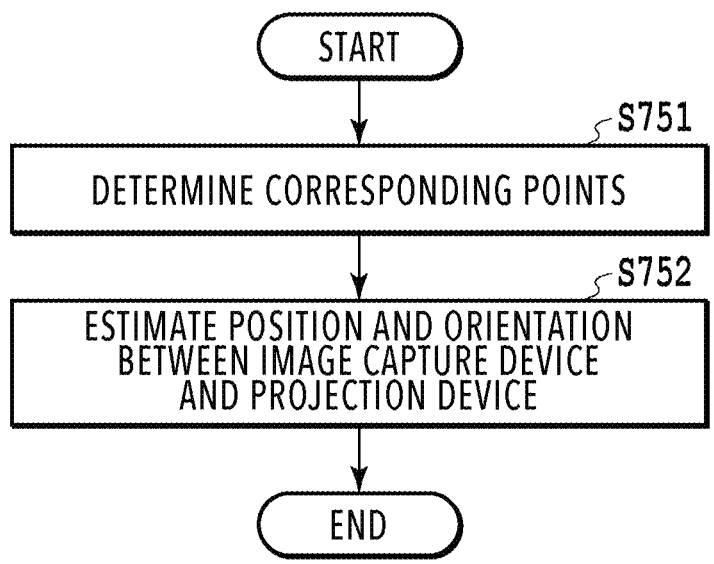

FIG. 7B is a flowchart explaining the second positioning process executed in S404 in the present modification. S751 is similar to the process in S651 described in embodiment 1. In S752, the positioning unit 203 estimates the position and orientation $[R|T]_{pc}$ between the image capture device 250 and the projection device 150. Specifically, the positioning unit 203 estimates an essential matrix by using the corresponding points between the image capture device 250 and the projection device 150 and the intrinsic parameters of the image capture device 250 and the intrinsic parameters of the projection device 150 held in the data holding unit 202. Then, the positioning unit 203 decomposes the essential matrix into orientation and position components to estimate the position and orientation $[R|T]_{pc}$ between the image capture device 250 and the projection device 150.

As discussed above, in the case where the surface shape of the print product 100 is known, it is possible to perform positioning of the print product 100 and the projection device 150 with respect to each other by using features extracted from the three-dimensional shape of the print product 100, and transform the projection content image on the basis of the result of the positioning.

<Modification 3>

In embodiment 1, the print product 100 is described as an example of the projection target object. However, the projection target object may be any object, such as a sheet painting, a wall painting, or a screen with an image projected thereon from a projection device, as long as image feature points as represented by patterns, designs, or the like, are extractable from a captured image of such a projection target object. In the case where the projection target object is a sheet painting or a wall painting, the data holding unit 202 may hold three-dimensional shape data or two-dimensional image data of the projection target object in place of the image of the print product 100. For example, the data holding unit 202 may hold three-dimensional shape data of the projection target object generated by measuring the three-dimensional position of the surface of the projection target object with a three-dimensional scanner or the like. In this case, the positioning can be performed by using the method described in modification 2. Two-dimensional image data of the projection target object can be generated by measuring the colors of the projection target object and the three-dimensional position of its surface with an RGBD scanner to thereby generate three-dimensional shape data of the projection target object, which contains its color information as well, and further by projecting the three-dimensional shape data onto a two-dimensional plane. In this case, the positioning can be performed by using the method in embodiment 1 or modification 1. Note that the method of generating three-dimensional shape data and two-dimensional image data of the projection target object is not limited to the above but may be any method. For example, three-dimensional data may be generated by capturing images of the projection target object from a plurality of viewpoints and applying a multi-view stereo technique to the captured images.

By using the method discussed above, the positional relation between a print product and a projection device can be estimated by using an image capture device even in the case where the projection target object is other than a print product such for example as a sheet painting, a wall painting, or a screen with an image projected thereon from a projection device. Then, the projection content image can be transformed on the basis of the result of the positioning.

<Modification 4>

In the example described in embodiment 1, in S405, the image transformation unit 204 transforms the entire projection content image to transform the projection content image into an image in the projector coordinate system. In the present modification, a description will be given of a mode in which the image transformation unit 204 refers to the projection region information held in the data holding unit 202 and transforms only a region in the projection content image corresponding to the projection region.

Figure 8:
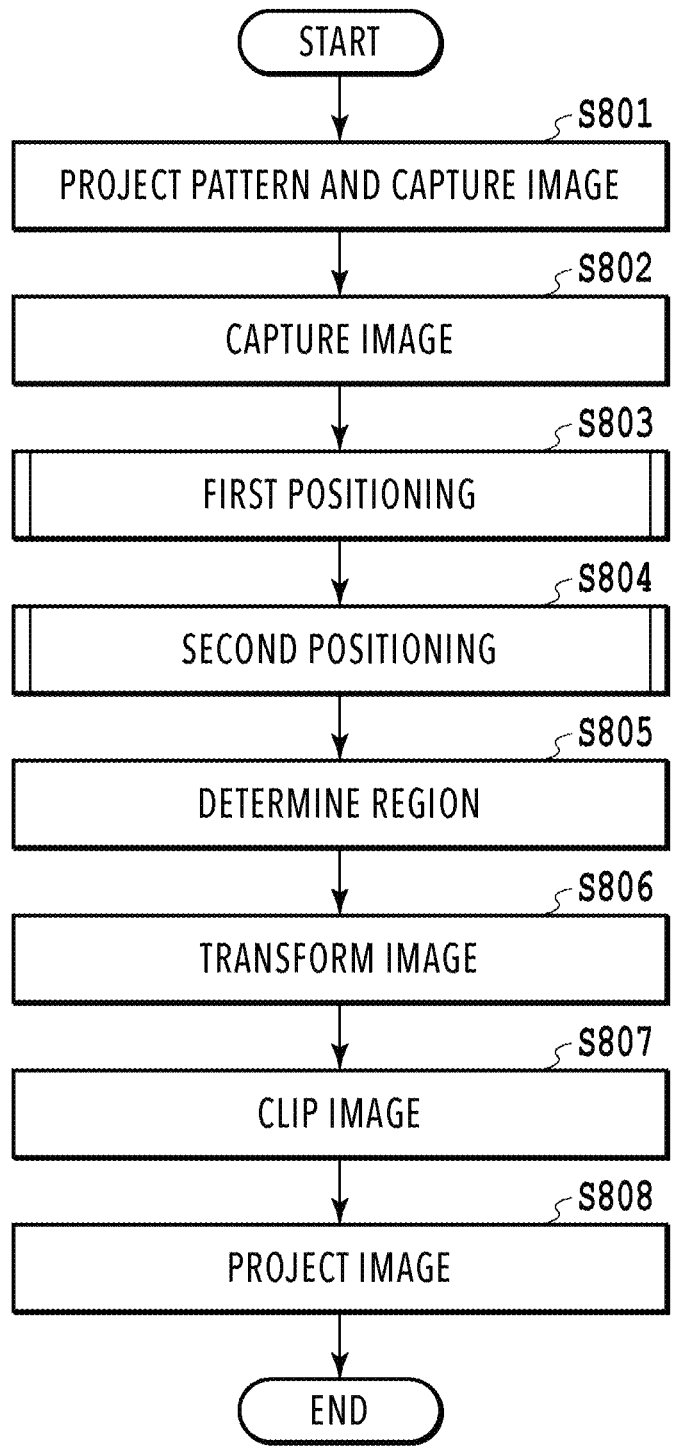
FIG. 8 is a flowchart illustrating an example of an entire process.

FIG. 8 is a flowchart illustrating an example of the entire process performed by the image processing apparatus 200 in the present modification. S801 to S804 are similar to the processes in S401 to S404 described in embodiment 1.

In S805, the region determination unit 205 refers to the projection region information held in the data holding unit 202 and determines the projection region in the projection content coordinate system. In other words, in the present modification, before the projection content image is transformed, the region determination unit 205 performs a process of determining the projection region in the projection content coordinate system. This will be described below using diagrams.

Figure 9:
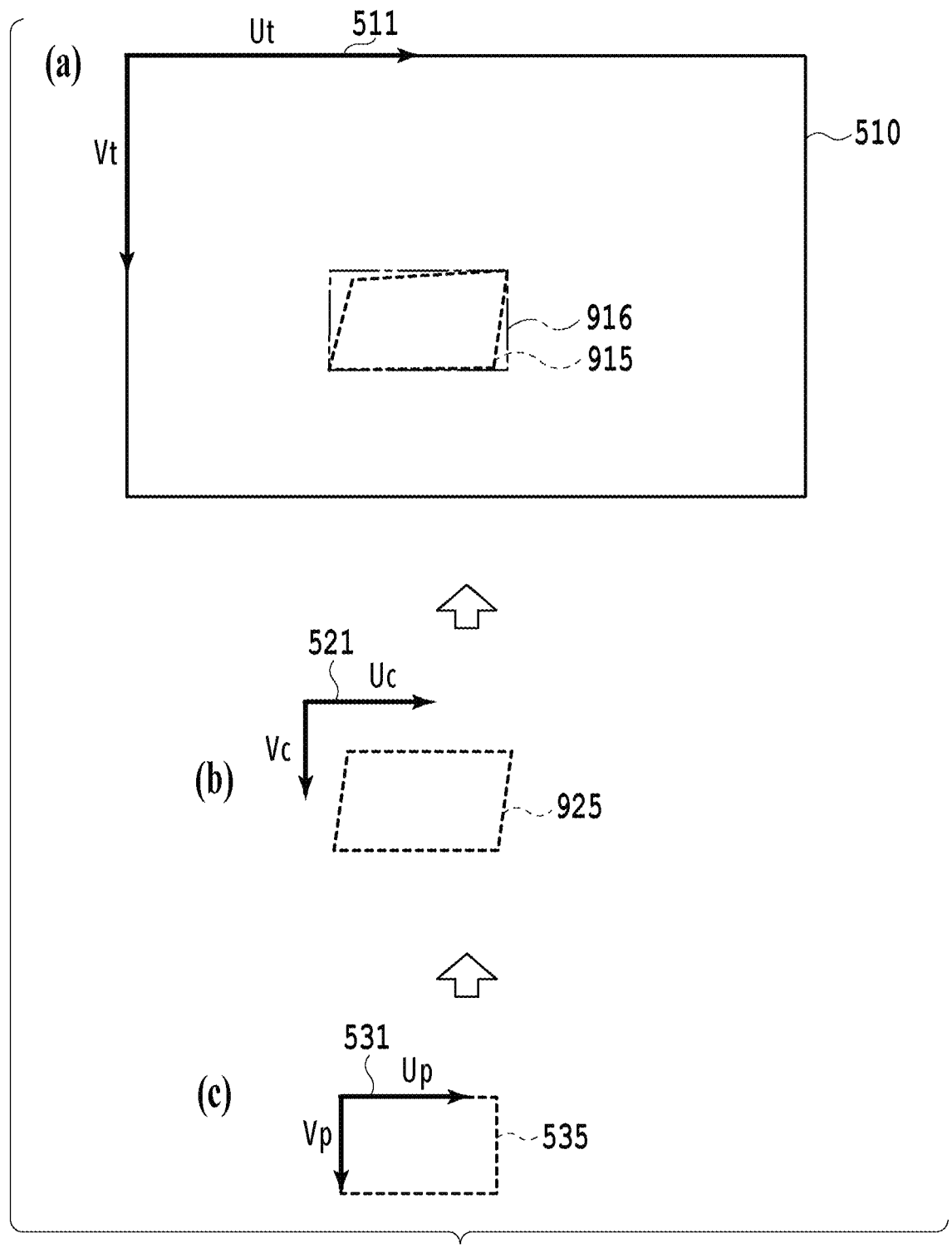
FIG. 9 is a diagram explaining coordinate system conversions.

FIG. 9 is a diagram explaining the coordinate system conversions in the present modification. In the present modification, the region determination unit 205 performs a process of determining a projection region 915 in the content coordinate system 511 from the projection region 535 in the projector coordinate system 531 illustrated in (c) in FIG. 9. First, as illustrated in (c) in FIG. 9, the region determination unit 205 determines the projection region 535 in the projector coordinate system 531. The projection region 535 is the region inside the closed curve linking four sets of coordinates (0, 0), (X-direction resolution −1, 0), (X-direction resolution −1, Y-direction resolution −1), and (0, Y-direction resolution −1), determined by referring to the projection region information.

Then, as illustrated in (a) in FIG. 9, the region determination unit 205 determines the projection region 915 in the content coordinate system 511. The projection region 915 may be figured out in the following manner. First, as illustrated in (c) and (b) in FIG. 9, the region determination unit 205 converts the projection region 535 in the projector coordinate system 531 into a projection region 925 in the camera coordinate system 521 by using the inverse matrix of the homography $H_{pc}$ between the image capture device 250 and the projection device 150 estimated in S804. Further, as illustrated in (b) and (a) in FIG. 9, the region determination unit 205 converts the projection region 925 in the camera coordinate system 521 into a projection region 915 in the content coordinate system 511 by using the inverse matrix of the homography $H_{ct}$ between the print product 100 and the image capture device 250 estimated in S803.

Then, in S806, the image transformation unit 204 transforms only the partial image in the projection content image 510 within a partial region 916 including the projection region 915, determined in S805. The partial region 916 is a region defined by partially expanding the projection region 915. The partial region 916 may be of any size and shape as long as it includes the projection region 915 and is within the size of the projection content image 510. For example, the partial region 916 may be a circumscribed rectangle around the projection region 915. Alternatively, the partial region 916 may be a region defined by widening the projection region 915 by several pixels. If the image capture device 250, the projection device 150, or the print product 100 is subtly displaced by vibration or the like, the processes in S805 and S806 may need to be executed again in some cases. With the partial region 916 set to be wider than the projection region 915, the projection region 915 will remain included in the partial region 916 even if a subtle displacement as above occurs. It is therefore possible to omit re-execution of the processes.

S807 and S808 are similar to the processes in S407 and S408 described in embodiment 1. Note that the image clipping process in S807 can be omitted in a case where the projection region 915 and the partial region 916 in the content coordinate system 511 are the same.

By using the method discussed above, only a part of the projection content image can be transformed, instead of the entire projection content image. This reduces the load of the image transformation process.

Embodiment 2

Embodiment 1 has been described taking as an example a mode in which a single projection device is used to project a projection content image. In this embodiment, a description will be given of an example of an image projection system that presents and superimposes projection content images projected from a plurality of projection devices onto a print product.

Figure 10:
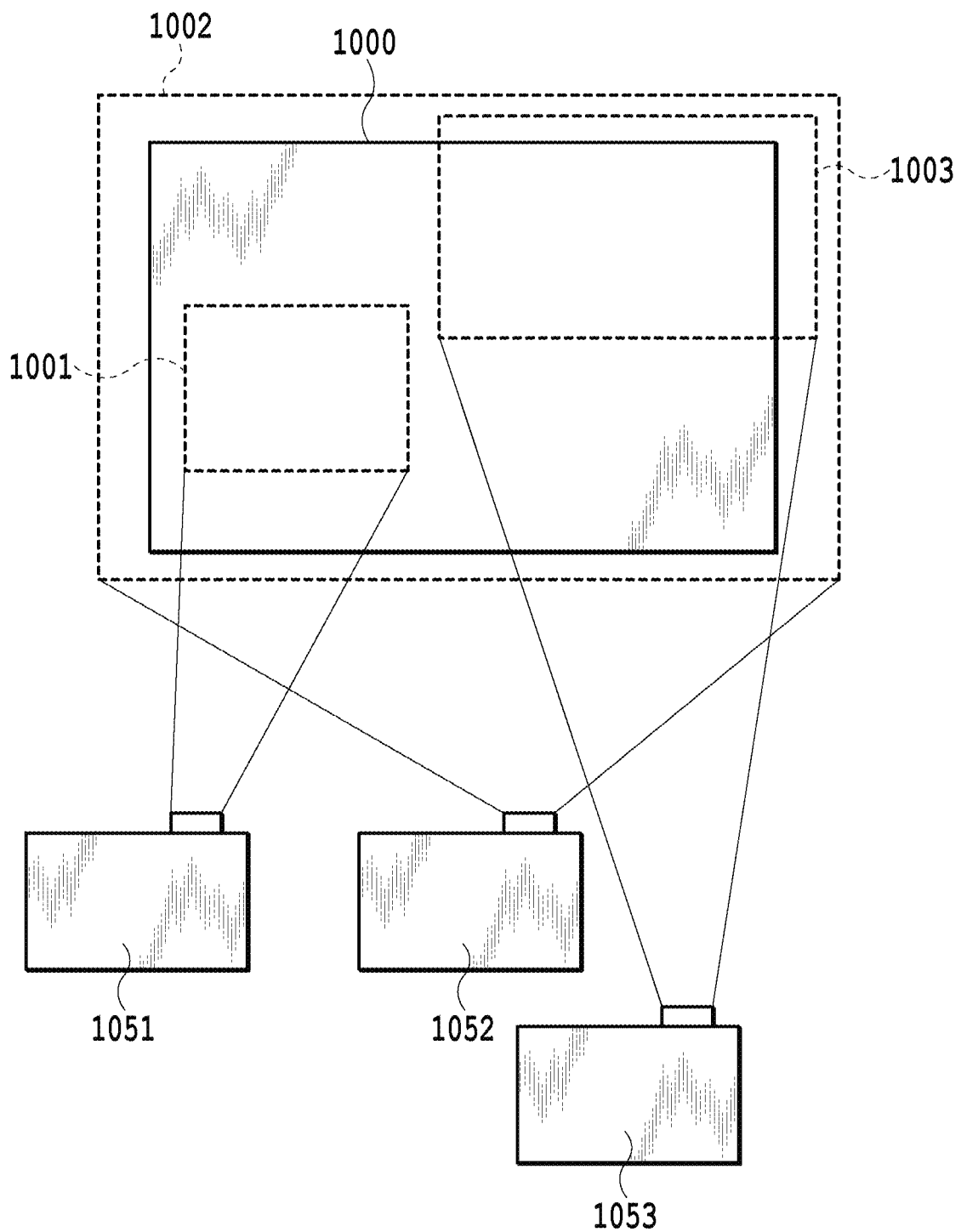
FIG. 10 is a diagram explaining an overview of an image projection system.

FIG. 10 is a diagram illustrating an overview of the image projection system in the present embodiment. Projection images are projected onto a print product 1000 from projection devices 1051, 1052 and 1053 within projection regions 1001, 1002, and 1003, respectively. The projection device 1052 projects a projection image onto the entire print product 1000. The projection devices 1051 and 1053 project projection images onto partial regions in the print product 100. Note that the number of projection devices is three for the sake of description. The number of projection devices is not limited.

<Block Diagram>

Figure 11:
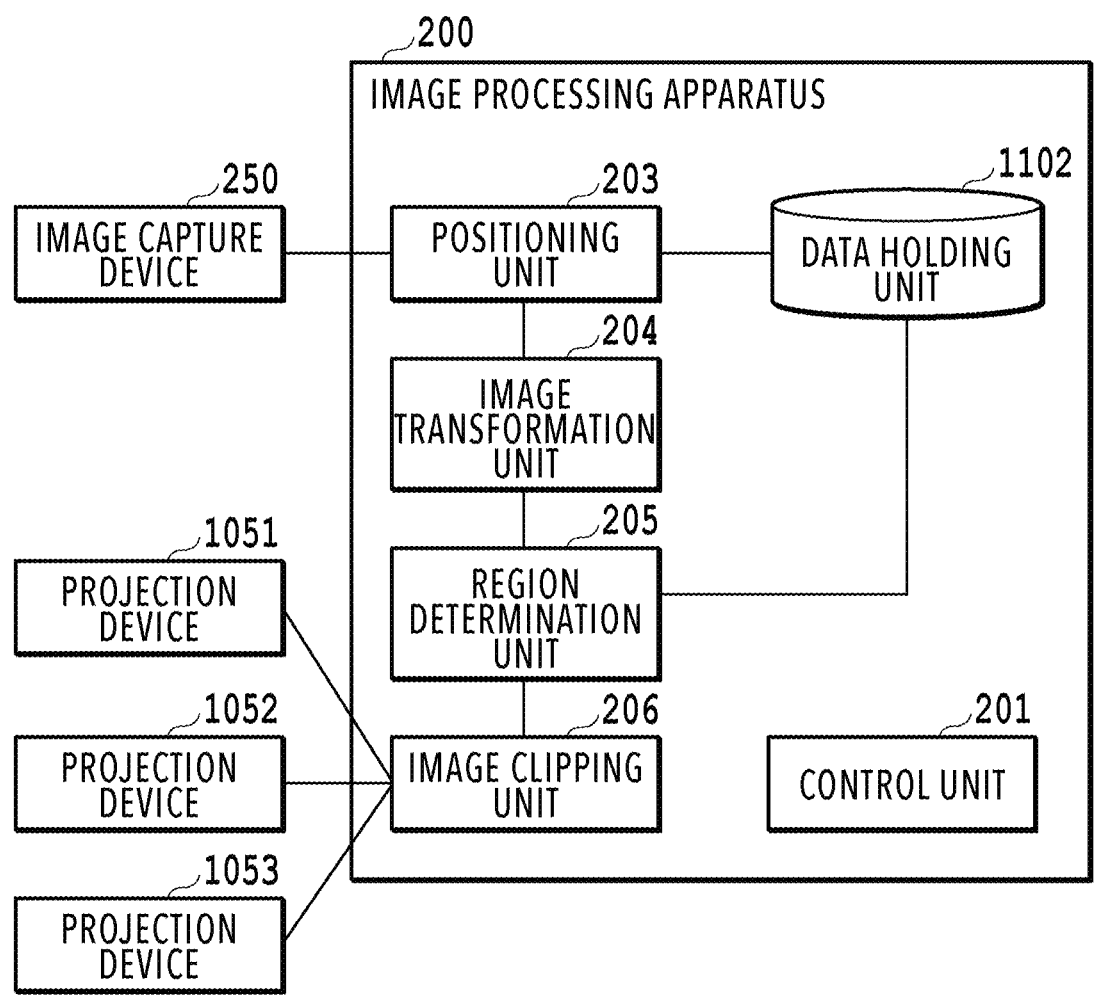
FIG. 11 is a diagram illustrating an example of the functional configuration of the image projection system.

FIG. 11 is a diagram illustrating an example of the functional configuration of the image projection system according to the present embodiment. As illustrated in FIG. 11, the image projection system according to the present embodiment comprises an image capture device 250, a data holding unit 1102, the projection devices 1051, 1052, and 1053, and an image processing apparatus 200. Since the contents of the present embodiment are similar to those described in embodiment 1 using FIG. 2 except data held in the data holding unit 1102, only the data holding unit 1102 will be described.

The data holding unit 1102 holds: the content image on the print product 1000; the projection content images to be projected from the projection devices 1051, 1052, and 1053; and the projection region information. The projection content image to be projected from each projection device may be the same as or different from those of the other projection devices. Also, it suffices that the content image on the print product 1000 and each projection content image are of the same image size (resolution), and they may be different images or the same image. The projection region information corresponds to the resolution of each projection device. The content image on the print product 1000 will be used in the positioning. On the basis of the result of the positioning and the projection region information, the projection content images are transformed and the transformed projection images are projected from the respective projection devices 1051, 1052, and 1053, as described in embodiment 1.

The process in the present embodiment will be described. The entire process performed by the image processing apparatus 200 according to the present embodiment involves performing the process in embodiment 1 described using the flowchart in FIG. 4 for each projection device. Note that S402 and the first positioning process in S403 may just need to be executed only for one of the projection devices, and the obtained estimation result may be used in the processes for the other projection devices.

As discussed above, in the present embodiment, in the case of using a plurality of projection devices, the second positioning process is performed for each projection device. Thus, even in the case where the projection devices differ from each other in resolution or projection region, clip regions of the same resolutions as those of the projection devices are automatically clipped from the content image. Moreover, the projection image projected from each projection device is a projection image transformed to accurately coincide with the corresponding region in the print product.

Embodiment 3

<Overview>

Figure 12:
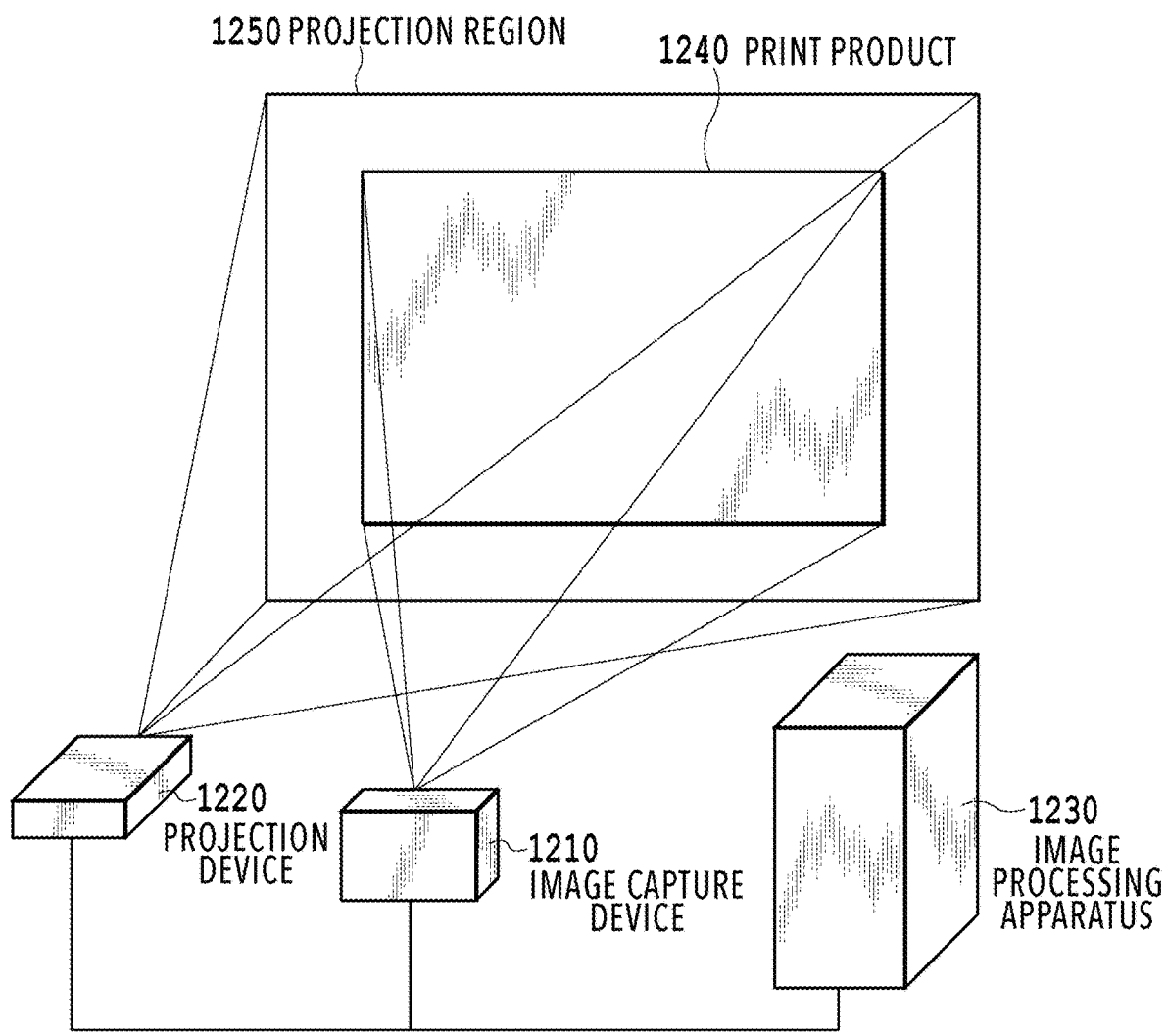
FIG. 12 is a diagram illustrating the configuration and an overview of an image projection system.

FIG. 12 is a diagram illustrating the configuration and an overview of an image projection system in embodiment 3. An overview of the present embodiment will be described using FIG. 12. As illustrated in FIG. 12, the image projection system comprises an image capture device 1210, a projection device 1220, and an image processing apparatus 1230. The image processing apparatus 1230 is capable of transmitting and receiving image data and various pieces of control information to and from the image capture device 1210 and the projection device 1220.

In the present embodiment, as illustrated in FIG. 12, a print product 1240 is the projection target object. The print product 1240 is a poster, for example. In the present embodiment, a single projection device 1220 is provided which is installed to be capable of projecting an image over the entire print product 1240. It suffices that the projection device 1220 can project an image over the entire print product 1240, and does not have to be installed with its position accurately adjusted relative to the print product 1240.

In the present embodiment, the image processing apparatus 1230 generates a projection image to be projected by the projection device 1220 on the basis of the positional relation between the projection device 1220 and the print product 1240. This positional relation is estimated using images captured by the image capture device 1210. The image capture device 1210 is installed at such a position as to be capable of capturing an image of the print product 1240 and its surrounding region. Specifically, the image capture device 1210 is installed such that the print product 1240 is included within the angle of view of the image capture device 1210.

The projection device 1220 projects a projection image generated by the image processing apparatus 1230. As a result, the projection image is projected and superimposed onto the print product 1240. In this way, a certain color(s) in the print product 1240 can be emphasized and/or a certain image effect can be added.

<Description of Configuration>

The image capture device 1210 captures images under control of the image processing apparatus 1230. The image capture device 1210 outputs the captured image data to the image processing apparatus 1230. In the present embodiment, the image capture device 1210 captures an image of the print product 1240 and also captures images of positioning patterns projected by the projection device 1220. The captured image data obtained by the image capture of the print product 1240 will be referred to as the first captured image data, and the captured image data obtained by the image capture of the positioning patterns will be referred to as the second captured image data.

In the present embodiment, the image capture of the print product 1240 and the image capture of the positioning patterns projected by the projection device 1220 are done without changing any of the position, the orientation, the angle of view, and so on of the image capture device 1210. Although the image capture device 1210 in the present embodiment will be described as a color camera, it may be a monochrome camera or an infrared camera as along as it can capture images of the print product and the positioning patterns.

The projection device 1220 is installed such that the projection region 1250 includes the print product 1240. The projection device 1220 projects the projection image generated by the image processing apparatus 1230 under control of the image processing apparatus 1230. The projection image is an image generated by transforming an image of a projection content (hereinafter referred to as "projection content image"). Details will be described later. The projection content image is an image associated with the image on the print product 1240 (hereinafter referred to as "content image"). For example, at least part of the projection content image is the same as at least part of the content image on the print product 1240. The projection device 1220 also projects positioning patterns (pattern images).

Figure 13:
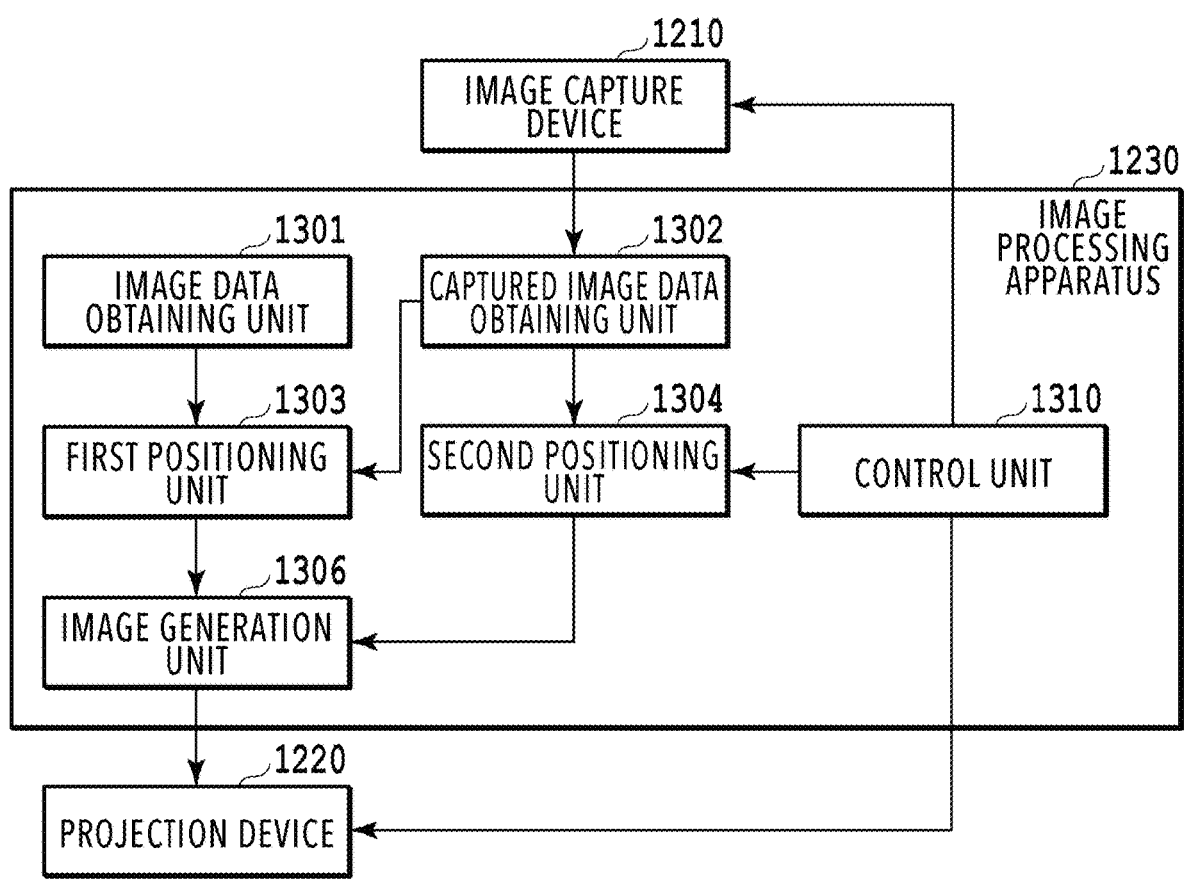
FIG. 13 is diagram illustrating the functional configuration of an image processing apparatus.

FIG. 13 is a diagram including blocks representing the functional configuration of the image processing apparatus 1230. The image processing apparatus 1230 comprises an image data obtaining unit 1301, a captured image data obtaining unit 1302, a first positioning unit 1303, a second positioning unit 1304, an image generation unit 1306, and a control unit 1310. A CPU 301 is capable of implementing some or all of units in the image processing apparatus 1230 illustrated in FIG. 13 by deploying a program stored in a storage unit 303 to a main memory 302 and executing it. Alternatively, some or all of the units may be implemented with dedicated hardware.

The control unit 1310 controls the entire image processing apparatus 1230. The control unit 1310 can control the image capture of the image capture device 1210 and the projection of the projection device 1220. In other words, the control unit 1310 is capable of controlling the entire image projection system. Although the present embodiment will be described taking as an example a mode in which the control unit 1310, which controls the entire image projection system, is included in the image processing apparatus 1230, the present invention is not limited to this mode. A control apparatus (not illustrated) that controls the entire image projection system may be prepared as a separate apparatus from the image processing apparatus. Alternatively, a control unit that controls the entire image projection system may be included in the image capture device 1201 or the projection device 1220. The control unit 1310 is also capable of supplying positioning patterns stored in the storage unit 303 or the like to the projection device 1220.

The image data obtaining unit 1301 obtains image data of a print product designated by the user through a user interface not illustrated or the like (referred to as "first image data" or "content image data") from the storage unit 203 or the like. The image data obtaining unit 1301 supplies the obtained content image data to the first positioning unit 1303. Note that the image data obtaining unit 1301 does not have to obtain content image data designated by the user but may obtain predetermined image data.

The captured image data obtaining unit 1302 obtains image data captured by the image capture device 1210 and supplies it to the first positioning unit 1303 or the second positioning unit 1304. Note that the control unit 1310 may cause the projection device 1220 to project white light or gray light when the image capture device 1210 captures the image to be supplied to the first positioning unit 1303. This prevents the print product 1240 from appearing dark in the captured image data (first captured image data). Also, in a case where the content image data and the captured image data differ in color, the control unit 1310 may control the projection device 20 to perform such a projection that both have identical or similar colors. Specifically, the control unit 1310 may control the projection device 1220 to perform a projection that makes the two pieces of image data similar to each other in at least one of luminance and color.

The control unit 1310 supplies positioning patterns to the projection device 1220 and causes the projection device 1220 to project them when the image capture device 1210 captures an image to be supplied to the second positioning unit 1304. The image capture device 1210 captures images of the print product 1240 with the positioning patterns projected thereon. As a result, the captured image data to be supplied to the second positioning unit 1304 (second captured image data) is obtained. Gray code patterns, for example, can be used as the positioning patterns.

The first positioning unit 1303 receives the content image data obtained by the image data obtaining unit 1301 and the first captured image data obtained by the captured image data obtaining unit 1302. The first positioning unit 1303 then obtains the correspondence between the coordinates in the coordinate systems of the two images. The first positioning unit 1303 determines the positional relation between the print product 1240 and the image capture device 1210 on the basis of the obtained correspondence. Details will be described later.

The second positioning unit 1304 obtains the correspondence between the coordinates in the coordinate systems of the images of the second captured image data obtained by the captured image data obtaining unit 1302 and the positioning patterns (pattern images) projected for positioning. The second positioning unit 1304 determines the positional relation between the projection device 1220 and the image capture device 1210 on the basis of the obtained correspondence.

The image generation unit 1306 determines the positional relation between the print product 1240 and the projection device 1220 by using the positional relation between the print product 1240 and the image capture device 1210 determined by the first positioning unit 1303 and the positional relation between the projection device 1220 and the image capture device 1210 determined by the second positioning unit 1304. Then, on the basis of the determined positional relation between the print product 1240 and the projection device 1220, the image generation unit 1306 transforms the image data of the projection content such that the projection content image coincides with the print product 1240 when projected. As a result, image data of the projection image (second image data) is generated. Note that the image data of the projection content may be the image data obtained by the image data obtaining unit 1301. In other words, the content of the print product 1240 and the content of the projection image may be the same. Also, the image data of the projection content does not have to be the image data obtained by the image data obtaining unit 1301 but may be other image data of the same resolution. In short, the content of the print product 1240 and the content of the projection image may be different. The present embodiment will be described taking as an example the case where the content of the print product 1240 and the content of the projection image are the same.

<Flowchart>

Figure 14:
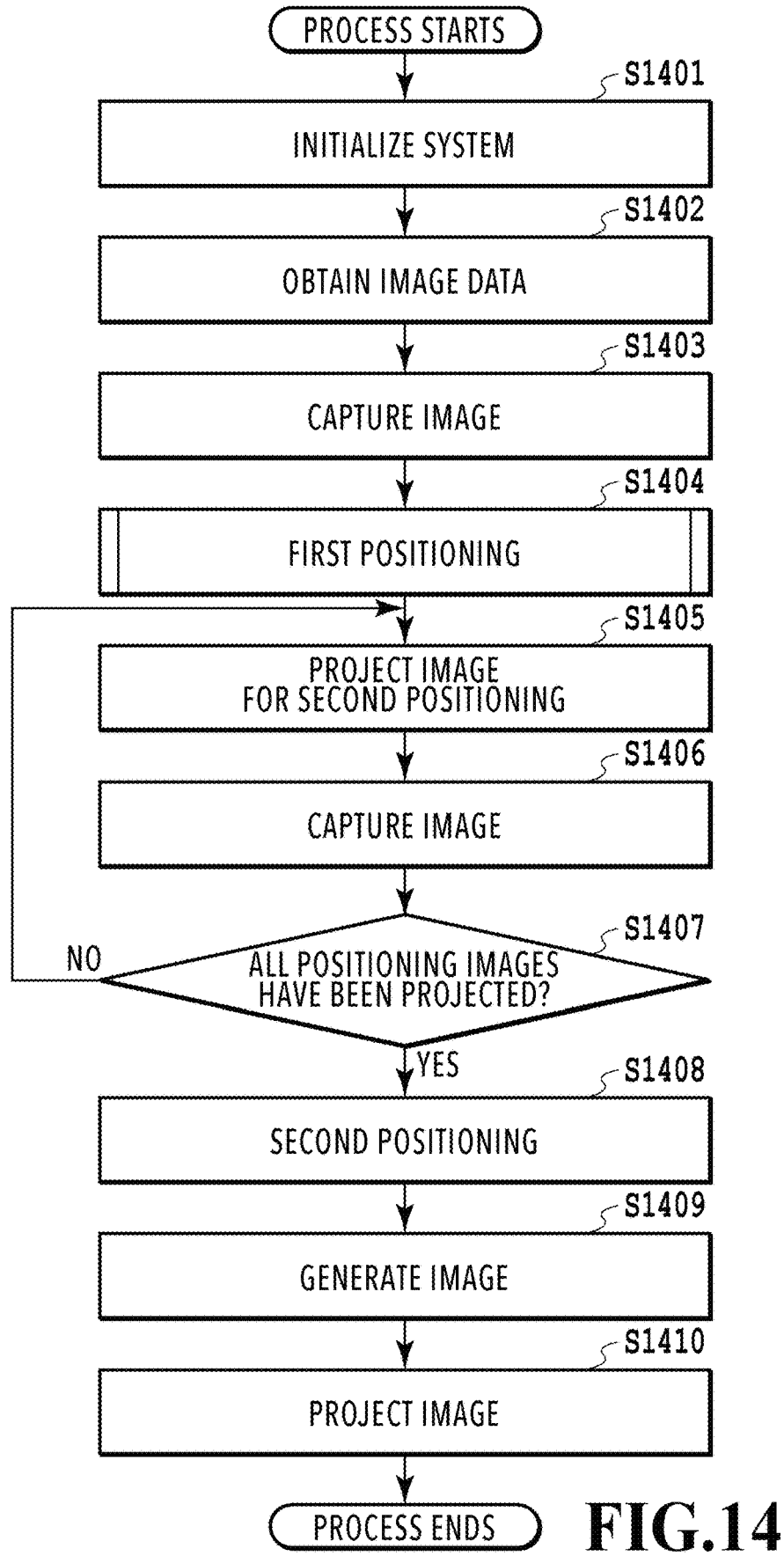
FIG. 14 is a flowchart of a process by the image projection system.

FIG. 14 illustrates an example flowchart of the process by the image projection system comprising the image processing apparatus 1230 in the present embodiment. The CPU 301 performs the series of processes illustrated in the flowchart of FIG. 14 by deploying program code stored in the storage unit 303 to the main memory 302 and executing it. Alternatively, the functions of some or all of the steps in FIG. 14 may be implemented with hardware such as an ASIC or an electronic circuit. Meanwhile, the symbol "S" in the description of each process means a step in the flowchart.

In S1401, the control unit 1310 initializes the image projection system. For example, the control unit 1310 starts the image capture device 1210 and the projection device 1220, connected to the image processing apparatus 1230, and sets various parameters.

In S1402, the image data obtaining unit 1301 obtains the image data of the print product 1240 (content image data) from the storage unit 203. In the example described here, the content image data is obtained from the storage unit 303. Note however that the content image data may be obtained from a different apparatus through a network or the like not illustrated. The content image data in the present embodiment is image data in which each single pixel is defined by three RGB components.

In S1403, the control unit 1310 outputs an image capture command to the image capture device 1210. The control unit 1310 may control the captured image data obtaining unit 1302 to output an image capture command to the image capture device 1210. By following the image capture command, the image capture device 1210 captures an image of the print product 1240 and its surrounding region. Note that the image capture device 1210 is installed in advance such that the entire print product 1240 is included within its angle of view. The captured image data obtaining unit 1302 obtains the image data captured by the image capture device 1210 (first captured image data). The image data captured by the image capture device 1210 in the present embodiment is image data in which each single pixel is defined by three RGB components, as with the content image data.

In S1404, the control unit 1310 controls the first positioning unit 1303 to execute a first positioning process. The first positioning unit 1303 obtains the correspondence between the coordinates in the image coordinate systems of the content image data of the print product 1240 obtained by the image data obtaining unit 1301 in S1402 and the first captured image data obtained by the captured image data obtaining unit 1302 in S1403. The first positioning unit 1303 determines the positional relation between the print product 1240 and the image capture device 1210 on the basis of the obtained correspondence.

Figure 15:
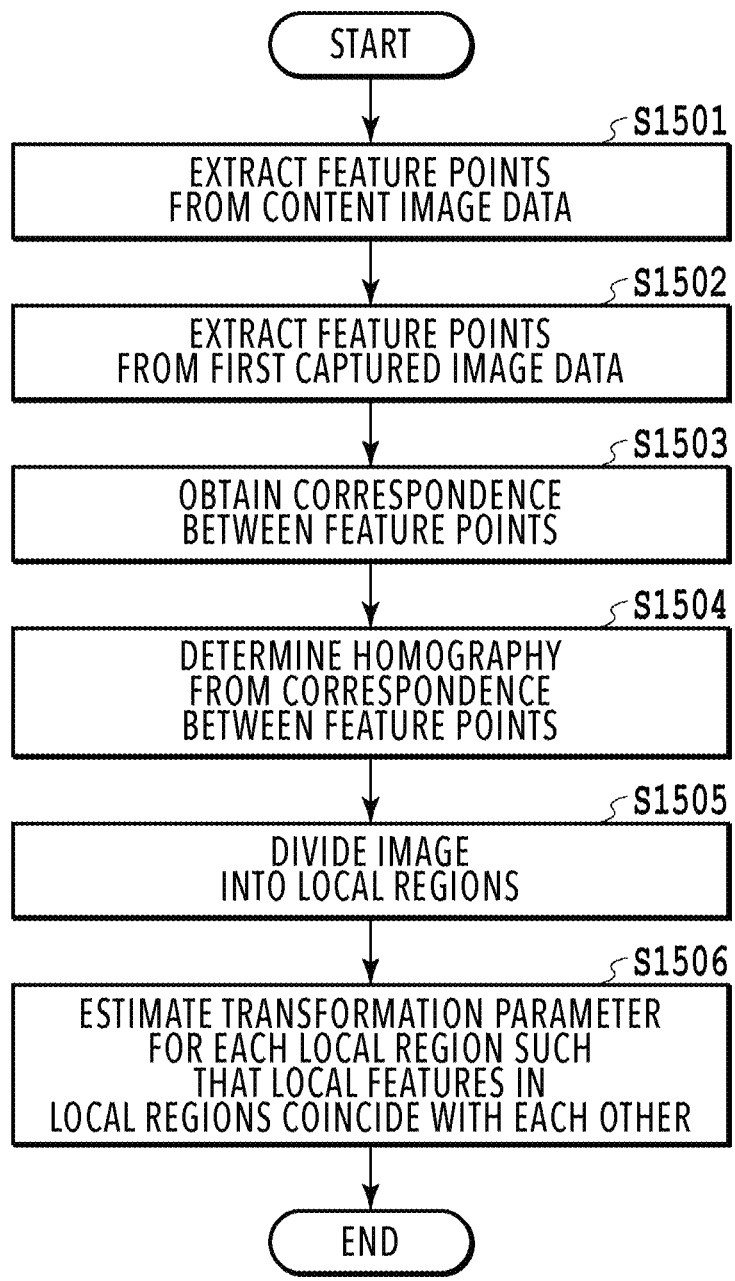
FIG. 15 is a flowchart of a first positioning process.

FIG. 15 is a flowchart illustrating details of the first positioning process in S1404. In S1501, the first positioning unit 1303 extracts feature points from the content image data of the print product 1240 obtained by the image data obtaining unit 1301. Examples of the feature points extracted here include A-KAZE features. A-KAZE features are features with which correspondence robust to scaling, rotation, luminance change, blur, and so on are obtainable. Note that the feature points to be extracted are not limited to A-KAZE features but may be any feature points as long as they are local features in the image.

In S1502, the first positioning unit 1303 extracts feature points from the first captured image data obtained by the captured image data obtaining unit 1302. As for the method of extracting the feature points, a similar method to that used in S1501 may be employed.

In S1503, the first positioning unit 1303 obtains the correspondence between the feature points extracted from the content image data in S1501 and the feature points extracted from the first captured image data in S1502. In other words, the first positioning unit 1303 obtains the correspondence between the coordinates in the coordinate system of the content image data and the coordinate system of the first captured image data. As for the method of obtaining the correspondence, a method may be employed which involves performing a full search to check every possible pair of feature points to find a pair that best coincides with each other in A-KAZE feature amount.

In S1504, the first positioning unit 1303 determines the homography between the content image data and the first captured image data from the correspondence between the feature points obtained in S1503. A homography represents a projective transformation that maps a plane into another plane. With the determined homography, the positional relation between the content image data and the first captured image data can be determined. Specifically, the correspondence between the sets of coordinates in a content image corresponding to the content image data and the sets of coordinates in a first captured image corresponding to the first captured image data is determined.

Note that in the present embodiment, in order to determine a more detailed positional relation, the positional relation between the content image and the first captured image is determined by a two-step method. For example, in the first step, a global positional relation between the content image and the first captured image is determined. In the second step, a local positional relation is determined to figure out a more detailed positional relation than that in the first step. The positional relation determined in S1504 may be the global positional relation. In S1504, a robust estimation such as RANSAC can be performed to accurately estimate the correspondence.

Figure 16A:
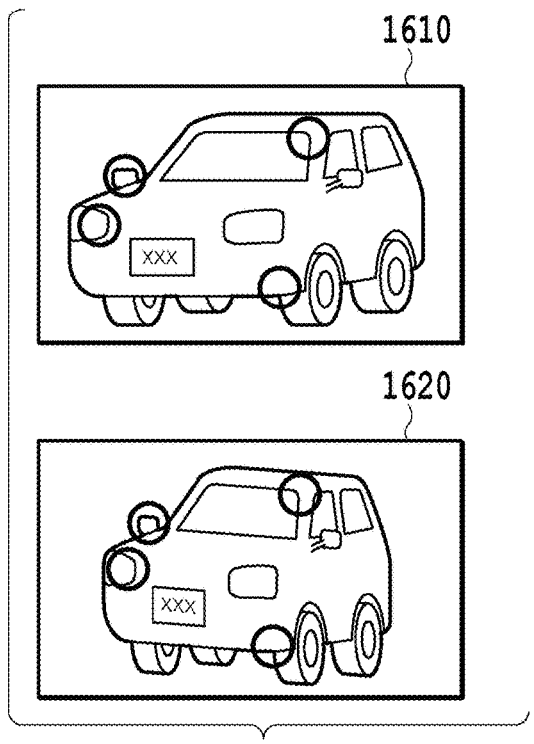
FIGS. 16A to 16C are diagrams explaining two-step determination of a positional relation.
Figure 16B:
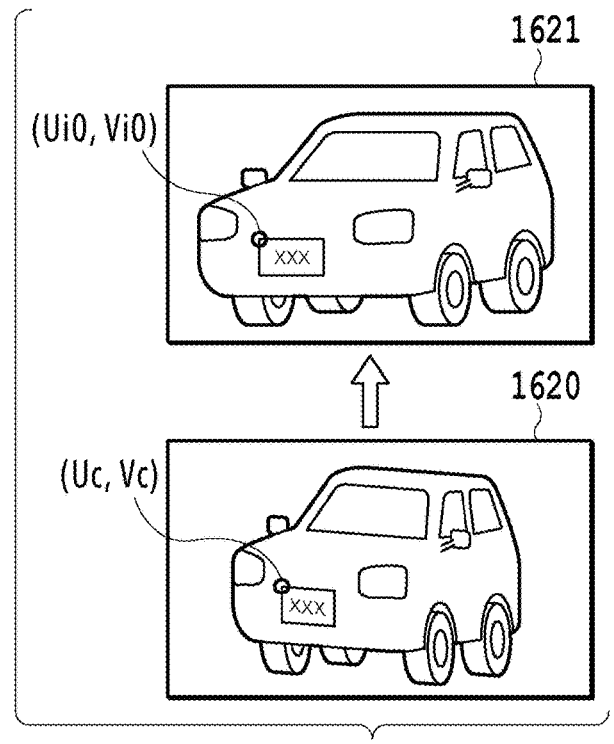
Figure 16C:
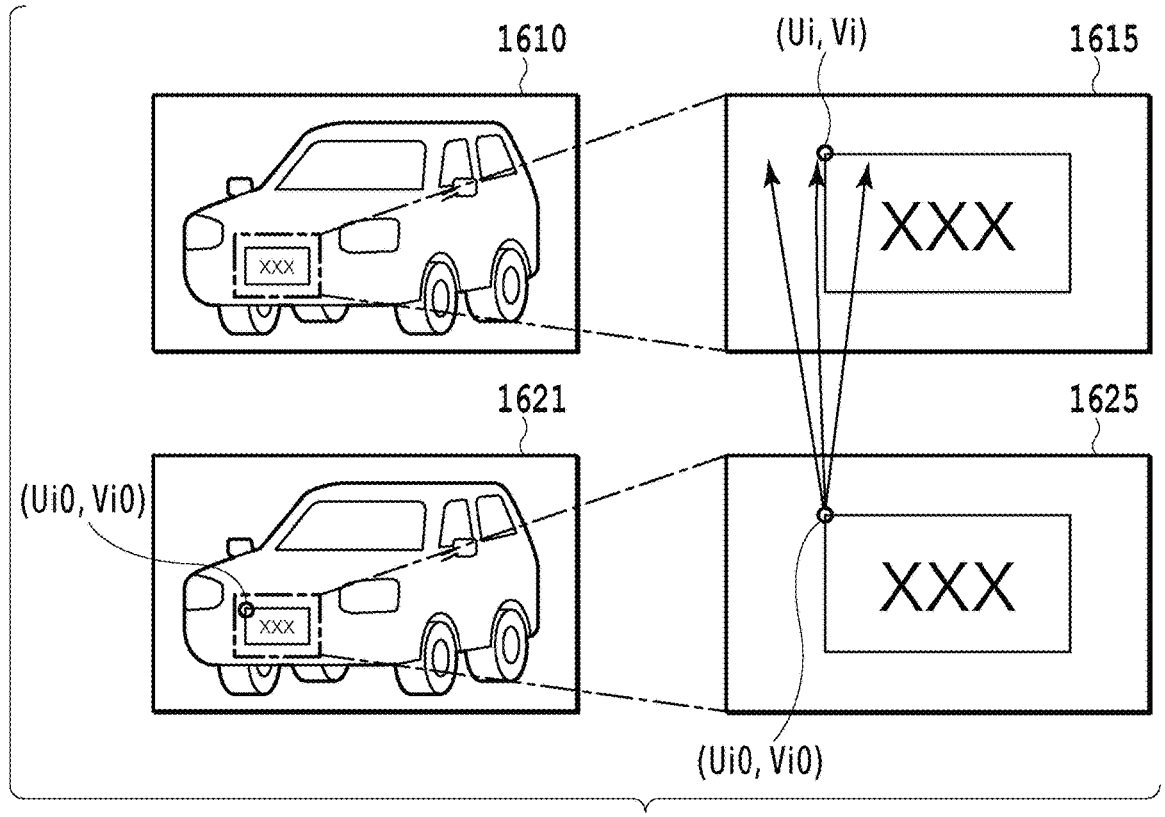

FIGS. 16A to 16C are schematic diagrams explaining the two-step determination of the positional relation. FIG. 16A illustrates a content image 1610 and a first captured image 1620. The positional relation between the content image 1610 and the first captured image 1620 is determined on the basis of the correspondence between feature points in the images. This positional relation is determined in S1504.

Referring back to FIG. 15, in S1505, the first positioning unit 1303 divides each of the content image and the first captured image into local regions represented by a mesh structure, in order to figure out a more detailed positional relation. For example, the first positioning unit 1303 divides each image into rectangle meshes of a size determined in advance in the initialization process in S1401. However, the block division method is not limited to the above and may be any method as long as it can divide each image into local regions. For example, each image may be divided into Voronoi regions with the feature points extracted in S1501 and S1502 as generating points. Alternatively, Delaunay triangulation may be used such that the feature points and corners in the image are Delaunay points.

In S1506, the first positioning unit 1303 estimates a transformation parameter between the content image data and the first captured image data for each local region (for a corner in each region) obtained by the division in S1505. First, with a homography H determined in S1504, the first positioning unit 1303 performs homography transformation of the first captured image data into image data in the coordinate system of the content image data. Specifically, on the basis of the global positional relation, the first positioning unit 1303 converts the set of coordinates of each pixel in the first captured image data to perform a coordinate conversion from the first captured image coordinate system into the content image coordinate system. FIG. 16B is a diagram schematically illustrating a converted image 1621 after the coordinate conversion from the first captured image coordinate system into the content image coordinate system.

Then, the first positioning unit 1303 focuses on a surrounding region around an initial set of coordinates ($U_{i0}$, $V_{i0}$) in the image data (in the content image coordinate system) obtained by the homography transformation of each set of image coordinates (Uc, Vc) in the first captured image data. In short, the first positioning unit 1303 focuses on a surrounding region around the initial set of coordinates ($U_{i0}$, $V_{i0}$) in the converted image 1621. FIG. 16C illustrates a surrounding region 1625 corresponding to a focused point in the converted image 1621 and a region 1615 in the content image 1610 at the same coordinate position as the surrounding region 1625. The first positioning unit 1303 searches the region 1615 in the content image for a position that best coincides with the focused point ($U_{i0}$, $V_{i0}$) in the surrounding region 1625 in the converted image 1621. In other words, the first positioning unit 1303 searches for a position at which the first captured image data after the homography transformation (converted image 1621) and the content image data (content image 1610) best coincide with each other. Then, the first positioning unit 1303 determines the position found to best coincide as a set of image coordinates (Ui, Vi) corresponding to the set of image coordinates (Uc, Vc) in the first captured image data. This process is performed for each set of coordinates to thereby determine the positional relation between the first captured image data and the content image data. Note that the transformation parameter indicating the positional relation between each pair of pixels can be held in the form of equation 5 as a set of image coordinates (Uc, Vc) in the first captured image data corresponding to a corner (Ui, Vi) in the corresponding region, obtained by dividing the content image data.

$$(Ui, Vi) = f(Uc, Vc) \tag{Equation 5}$$

Note that in a case where the positional relation is determinable with affine transformation, a common parameter f for all pixels may be held as the transformation parameter. Also, each pixel and its counterpart pixel may be mapped, and the mapped information may be held as the transformation parameter. The two-step positioning process has been described above. By performing global positioning and then performing positioning for each local region as discussed above, accurate positioning is performed even in a case where part of the surface of the print product 1240 is bent. However, the positioning may be done in one step as described earlier. By the first positioning process, the positional relation between the print product 1240 and the image capture device 1210 is determined.

Referring back to FIG. 14 to resume the description of the flowchart, in S1405, the control unit 1310 controls the projection device 1220 to project a positioning pattern for estimating the positional relation between the projection device 1220 and the image capture device 1210. A Gray code pattern, for example, can be used as the pattern for estimating the positional relation. A Gray code is a black-and-white pattern image, for example. The position can be estimated by projecting a plurality of pattern images with different patterns.

In S1406, the control unit 1310 outputs an image capture command to the image capture device 1210. The control unit 1310 may control the captured image data obtaining unit 1302 to output an image capture command to the image capture device 1210. By following the image capture command, the image capture device 1210 captures an image of the print product 1240 with the positioning pattern projected thereon and its surrounding region. The captured image data obtaining unit 1302 obtains the image captured by the image capture device 1210.

In S1407, the control unit 1310 determines whether the projection and the image capture of the positioning patterns have been completed. The control unit 1310 determines whether the projection and the image capture of all of the plurality of pattern images, as mentioned above, have been completed. If the projection and the image capture have not been completed, the next positioning pattern is set and the flow returns to S1405. If the projection and the image capture have been completed, the flow proceeds to S1408.

In S1408, the control unit 1310 controls the second positioning unit 1304 to execute a second positioning process. The second positioning unit 1304 is capable of determining the positional relation between the image capture device 1210 and the projection device 1220 by determining the correspondence between each projected positioning pattern and the second captured image data obtained by capturing an image of the projected positioning pattern. Here, the second positioning unit 1304 generates a map of sets of image coordinates (Uc, Vc) of the image capture device 1210 corresponding to sets of image coordinates (Up, Vp) of the projection device 1220. The positional relation between each pair of pixels can be expressed with equation 6 below.

$$(Uc, Vc) = g(Up, Vp) \tag{Equation 6}$$

Note that the processes in S1405 to S1408 can be processes performed in a case where the positional relation between the image capture device 1210 and the projection device 1220 has not been determined. In a case where the positions of the image capture device 1210 and the projection device 1220 are fixed, their homography will remain unchanged. For this reason, in a case where the result of a previous positioning process is stored in the storage unit 303, the second positioning unit 1304 may perform a process of obtaining the stored positioning result (positional relation) as the processes in S1405 to S1408.

In S1409, the control unit 1310 controls the image generation unit 1306 to execute an image generation process. The image generation unit 1306 transforms the image data of the projection content on the basis of the positional relation between the print product 1240 and the image capture device 1210 determined in S1404 and the positional relation between the image capture device 1210 and the projection device 1220 determined in S1408. The image data of the projection content before the transformation will be referred to as the projection content image data. As mentioned earlier, the projection content image data may be the same as or different from the content image data corresponding to the content image on the print product 1240. The resolutions of the projection content image data and the content image data are the same. The image generation unit 1306 transforms the projection content image data to generate transformed image data (also referred to as the second image data). The transformed image data is the image data of the projection image to be projected from the projection device 1220 and superimposed onto the print product 1240.

The sets of image coordinates (Ui, Vi) in the transformed image data corresponding to the sets of image coordinates (Up, Vp) in the projection content image are each determined with equation 7 by using equations 5 and 6.

$$(Ui, Vi) = f(g'(Up, Vp)) \tag{Equation 7}$$

where g' and f' represent addition of a linear interpolation process to g and f using near points.

Figure 17:
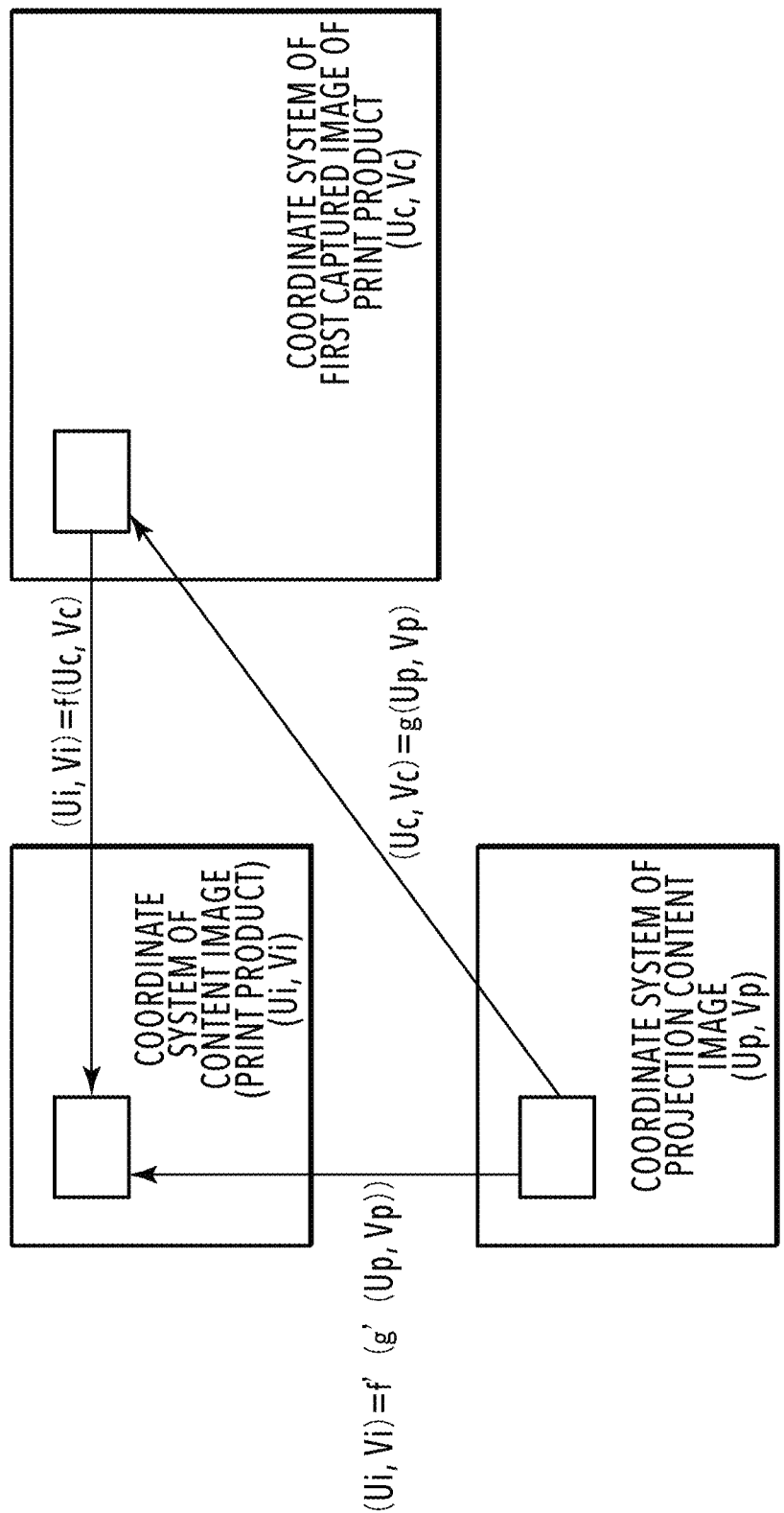
FIG. 17 is a diagram explaining the relations between coordinate systems.

FIG. 17 is a diagram illustrating the relation between the coordinate system of the content image on the print product 1240, the coordinate system of the first captured image of the print product 1240, and the coordinate system of the projection content image. In a case where the content image and the projection content image are images of the same scene, they are originally the same image. However, the projection content image is transformed in accordance with the positional relation between the projection device 1220 and the print product 1240. As illustrated in FIG. 17, this positional relation between the projection device 1220 and the print product 1240 is determined using the positional relation obtained as a result of the first positioning process and the second positioning process.

Referring back to FIG. 14, in S1410, the control unit 1310 controls the projection device 1220 to project the projection image generated in S1409 (transformed image data) toward the print product 1240. As a result, the projection image after the positioning between the print product 1240 and the projection device 1220 is projected and superimposed onto the print product 1240.

Meanwhile, any one of the positioning process between the print product 1240 and the image capture device 1210 in S1402 to S1404 and the positioning process between the image capture device 1210 and the projection device 1220 in S1405 to S1408 may be performed first. Also, it suffices that the process of obtaining the content image data in S1402 is performed before the first positioning process in S1404, and it may be performed after the image capture process in S1403. Also, the process in FIG. 14 has been described taking as an example a mode in which different pieces of captured image data are used in the first positioning process and the second positioning process. However, if the first positioning process can be performed using the second captured image data obtained by the second positioning process (the captured image data obtained by capturing images of the positioning patterns), the first positioning process may be performed using the second captured image data without the first captured image data. Also, a description has been given of an example where the first positioning process involves global positioning and positioning for each local region. The second positioning process may also involve global positioning and positioning for each local region.

As discussed above, in the present embodiment, the positional relation between the print product 1240 and the projection device 1220 is estimated by using the image capture device 1210. This enables automatic generation of the image data to be projected from the projection device 1220 and superimposed onto the print product 1240 such that the image data is aligned with the position on the print product. Thus, the projection image is projected and superimposed onto the print product 1240 without having the user accurately adjust the position of the projection device 1220 for the projection image. In short, on the basis of the positional relation between the print product 1240 and the projection device 1220, the projection content image is transformed so as to match that positional relation, and the transformed image is then projected. In this way, it is possible to obtain a projection result equivalent one obtained by having the user make an accurate adjustment. Also, in the present embodiment, by estimating the positional relation between the print product 1240 and the image capture device 1210 for each local region, accurate positioning is achieved even in the case where the print product 1240 is bent. By projecting this accurately positioned projection image, a certain color(s) in the print product 1240 can be emphasized and/or a certain image effect can be added. For example, the contrast of the image on the print product 1240 can be increased and/or the appearance of the print product 1240 can be changed.

<Modification 1>

In the mode described in embodiment 3, the first positioning process involves obtaining the homography between the print product 1240 and the image capture device 1210 on the basis of the correspondence between feature points in their images to thereby obtain a global positional relation, and further determining a transformation parameter for each local region. This enables determination of an accurate positional relation even in the case where the print product is bent. However, the method of positioning the print product 1240 and the image capture device 1210 is not limited to the above.

A description will be given of an example, as modification 1, in which the content image data of the print product 1240 is processed to stabilize the positioning. Specifically, the first positioning unit 1303 adds an outer frame of any suitable color to the content image data obtained by the image data obtaining unit 1301. Then, the first positioning unit 1303 figures out the correspondence between the content image data with the outer frame added and the first captured image data to thereby determine the positional relation between the print product 1240 and the image capture device 1210. Generally, in the first captured image data, obtained by capturing an image of the print product 1240 and its surrounding region, the boundary between the print product 1240 and its surrounding region is clear. On the other hand, the content image data is often an image without an outer frame on its outermost part. Then, by adding an outer frame to the content image data, the boundary between the images will be clear, thereby stabilizing the positioning during the association of feature points.

Note that in the process of adding an outer frame to the content image data, the size of the content image itself is not changed but the outermost part of the content image may be extended by several pixels and an outer frame may be added on the extended part.

In a case where the required accuracy of the positional determination is low, the determined homography between the print product 1240 and the image capture device 1210 may be defined as their positional relation, or the correspondence based on feature points may be defined as is as the positional relation between the print product 1240 and the image capture device 1210. Also, the process of figuring out the homography may be replaced with a method in which the user designates three or more corresponding points in the image data and the captured image data.

<Modification 2>

In the mode described in embodiment 3, the positioning of the image capture device 1210 and the projection device 1220 is performed using Gray code patterns as the positioning patterns. However, the positioning of the image capture device 1210 and the projection device 1220 is not limited to the above and it suffices that the correspondence between the pixels in the image data captured by the image capture device 1210 and the pixels in the positioning patterns (pattern images) from the projection device 20 is determined.

For example, by using phase shift patterns in addition to the Gray codes, corresponding points can be obtained at a sub-pixel level. Accurate positioning may be performed using this. Alternatively, it is possible to use a method capable of estimating the positional relation between the image capture device and the projection device by projection and image capture of a single pattern such as a single random dot pattern or a single wavy grid pattern. Such methods are capable of obtaining a positional relation even in the presence of a subtle change such as shaking of the print product.

Embodiment 4

In the mode described in embodiment 3, a single projection device is used to project and superimpose an image. The present embodiment will be described taking as an example a case where two projection devices are used. Although the present embodiment will be described taking as an example the case where two projection devices are used, the present embodiment is similarly applicable to cases where three or more projection devices are used.

Figure 18:
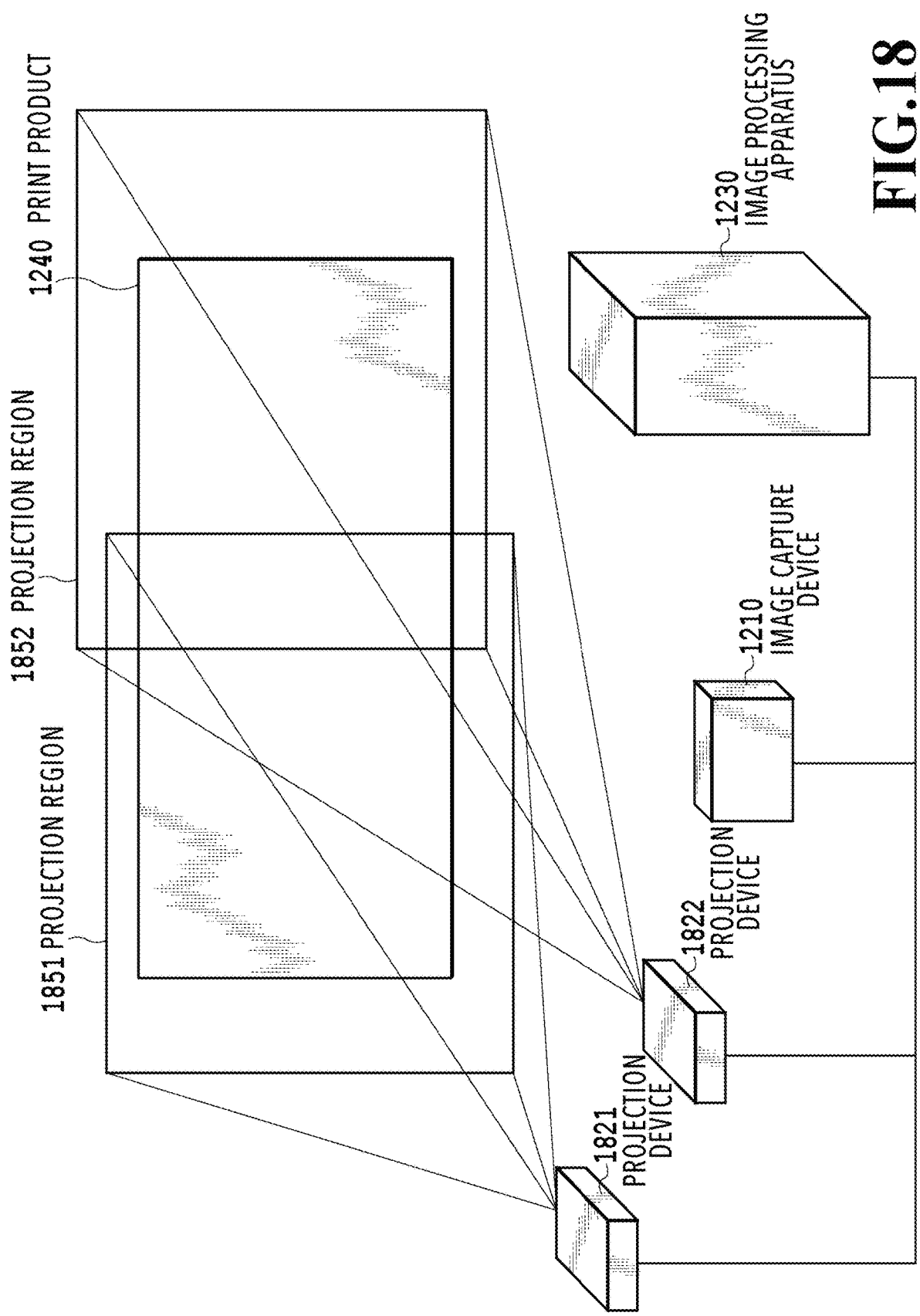
FIG. 18 is a diagram explaining an overview of an image projection system.

FIG. 18 is a diagram explaining an overview of the image projection system in the present embodiment. The image projection system comprises a projection device 1821, a projection device 1822, an image capture device 1210, and an image processing apparatus 1230. The image capture device 1210 is installed so as to be capable of capturing an image of a print product 1240 and its surrounding region. The projection device 1821 and the projection device 1822 are installed such that the projection regions of these projection devices overlap each other. The projection regions combined together are a region including the print product 1240. By using a plurality of projection devices to project images equivalent to a single content image, a high-resolution projection image is projected.

The configuration and function of the image processing apparatus 1230 in the present embodiment are basically the same as those in embodiment 3 except that there are a plurality of projection devices, and description thereof is therefore omitted. The image processing apparatus 1230 performs processes for each projection device. Note that the image generation unit 1306 performs a process of making the boundaries on the overlap of the projection regions unnoticeable. Details will be described later. In the present embodiment too, the projection content image to be projected from each projection device is an image of the same scene as the content image on the print product 1240. In other words, the projection device 1821 and the projection device 1822 use the same projection content image data for their projections.

Figure 19:
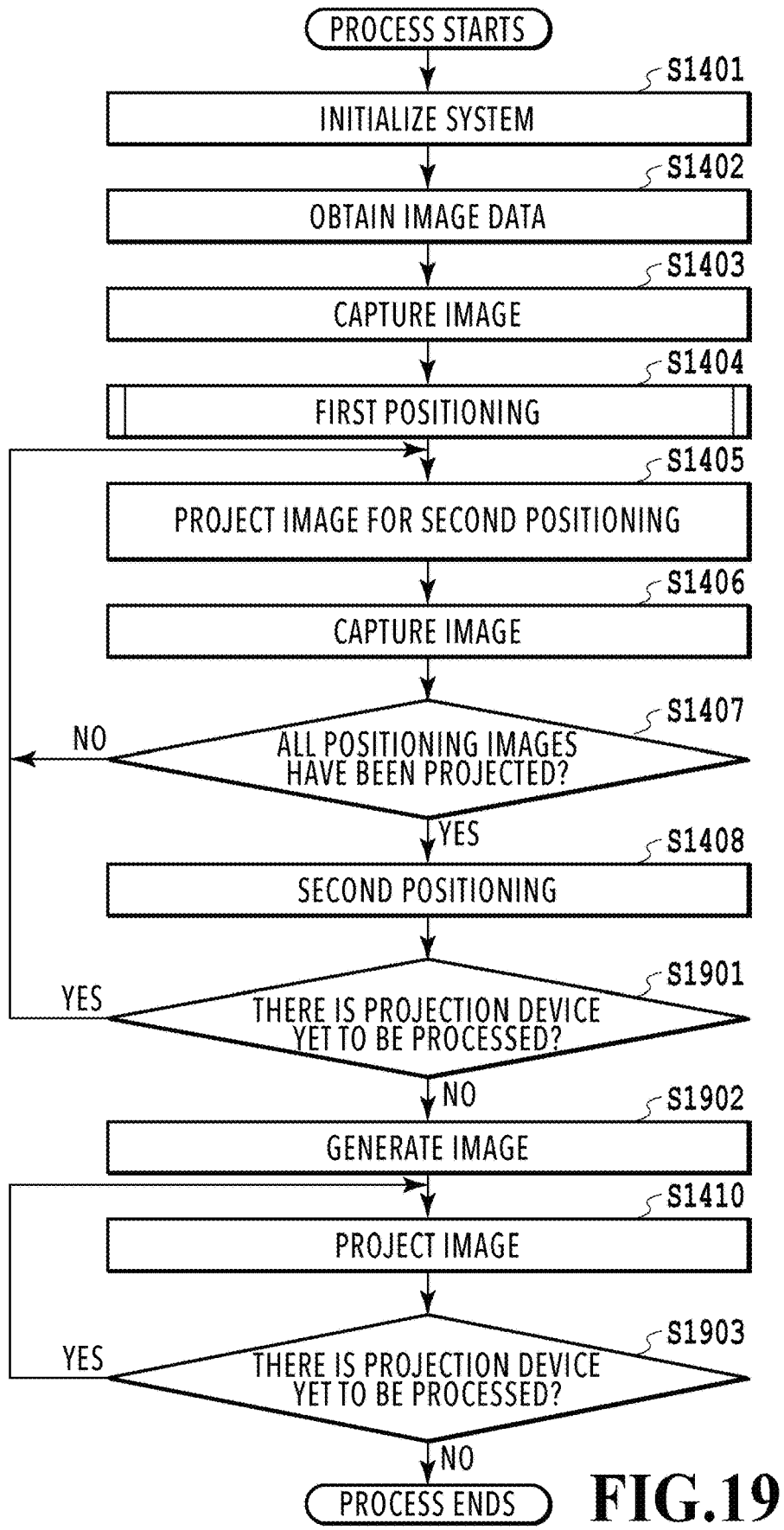
FIG. 19 is a flowchart of a process by the image projection system.

FIG. 19 is a flowchart illustrating a procedure of the process by the image projection system in the present embodiment. Note that processes similar to those in FIG. 14, described in embodiment 3, are denoted by the identical reference numerals. Description of the identical processes is omitted. The present embodiment additionally involves repetition determination processes (S1901, S1903) for repeating the image capture device-projection device positioning process in S1405 to S1408 and the projection process in S1410 for each projection device. Also, details of the image generation process in S1902 have been changed. Details of the other processes are the same as those in embodiment 3, and description thereof is therefore omitted.

In S1901, the control unit 1310 determines whether the processes in S1405 to S1408 have been repeated for each projection device. If there is a projection device yet to be processed, the processes will be repeated. In S1903, the control unit 1310 determines whether the process in S1410 has been repeated for each projection device. If there is a projection device yet to be processed, the process will be repeated.

In S1902, the image generation unit 1306 transforms the projection content image as in embodiment 3. In the present embodiment, in addition to the transformation described in embodiment 3, the image generation unit 1306 further performs a blending process in which the overlap between the projection regions of the plurality of projection devices is made unnoticeable in terms of luminance at the boundary between the overlap and each non-overlapping region.

Figure 20:
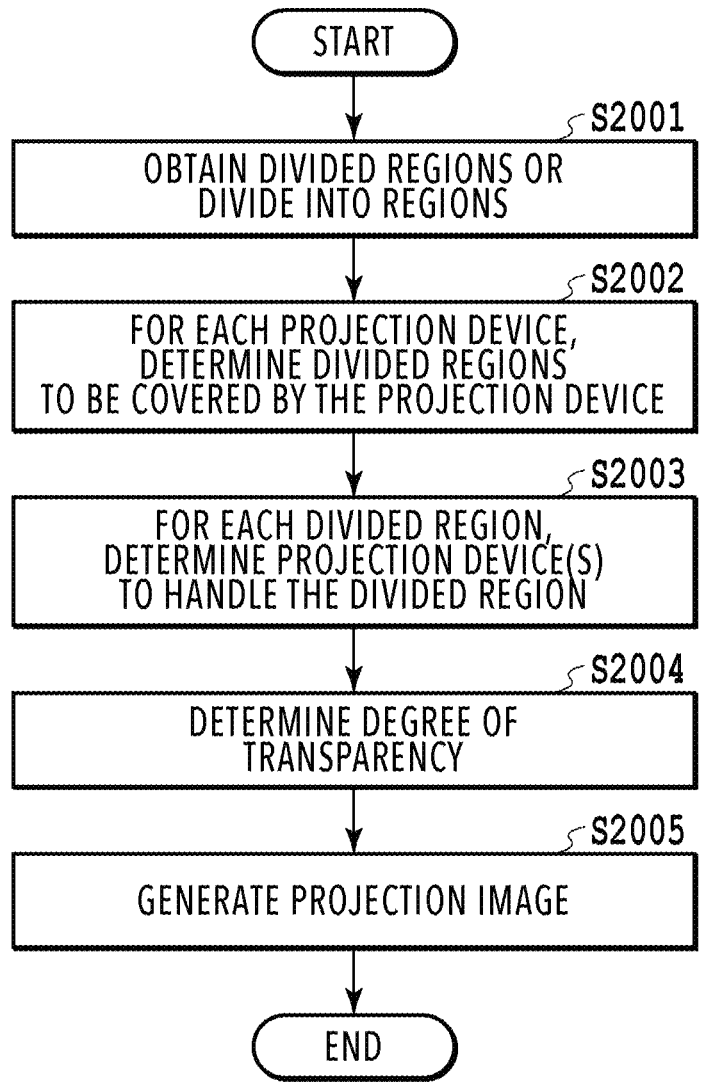
FIG. 20 is a flowchart of a blending process.
Figure 21A:
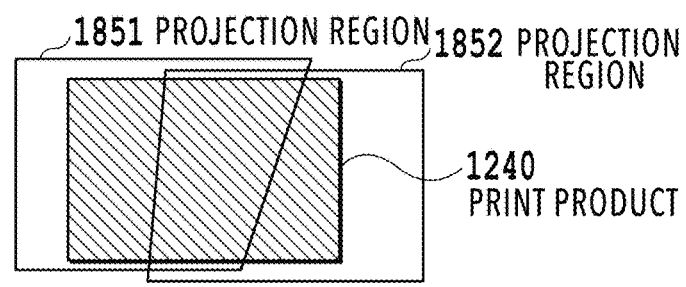
FIGS. 21A to 21E are schematic diagrams explaining the blending process.

FIG. 20 illustrates a detailed flowchart of the blending process. FIGS. 21A to 21E are schematic diagrams explaining the blending process. The blending process will be described below with reference to FIG. 20 and FIGS. 21A to 21E. FIG. 21A is a diagram illustrating the relation between the print product 1240, a projection region 1851 of the projection device 1821, and a projection region 1852 of the projection device 1822.

Figure 21B:
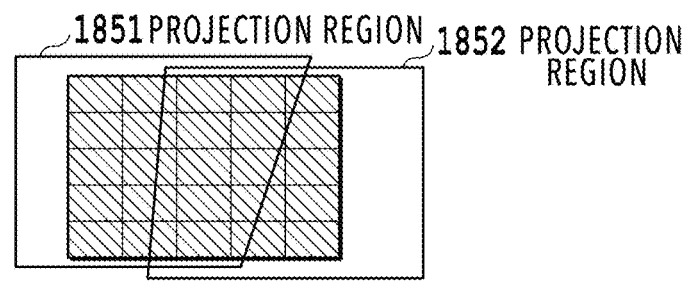
Figure 21C:
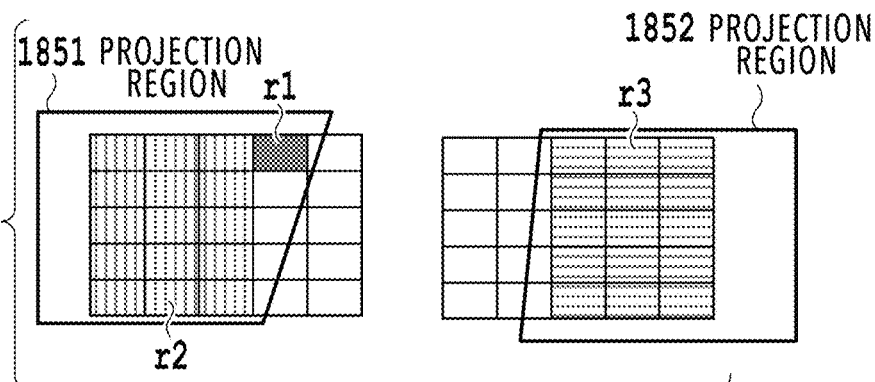

In S2001, the image generation unit 1306 divides the content image data of the print product 1240 into regions (cells). Alternatively, the image generation unit 1306 may obtain information on the local regions obtained by the division in S1404. FIG. 21B illustrates an example of the division of the content image data of the print product 1240 into regions.

In S2002, for each projection device, the image generation unit 1306 determines the divided regions to be covered by the projection device. In the present embodiment, the image generation unit 1306 identifies the column(s) or row(s) whose all cells are entirely included in the projection region. Then, the image generation unit 1306 determines the identified column(s) or row(s) in the projection region as the region which to be covered by the corresponding projection device. This will be described by taking an example. The projection region 1851 of the projection device 1821 in FIG. 21C entirely includes a cell r1 (gray region) in the first row of the fourth column. However, the projection region 1851 does not entirely include the other cells in the fourth column. In the projection region 1851 in FIG. 21C, there are three columns whose all cells in the vertical direction are covered. Thus, the image generation unit 1306 determines that the projection device 1821 will cover none of the cells in the fourth column, including the cell r1, and determines a vertical-line region r2 as a cover region for the projection device 1821. Similarly, the image generation unit 1306 determines a horizontal-line region r3 in the projection region 1852 as a cover region for the projection device 1822.

Figure 21D:
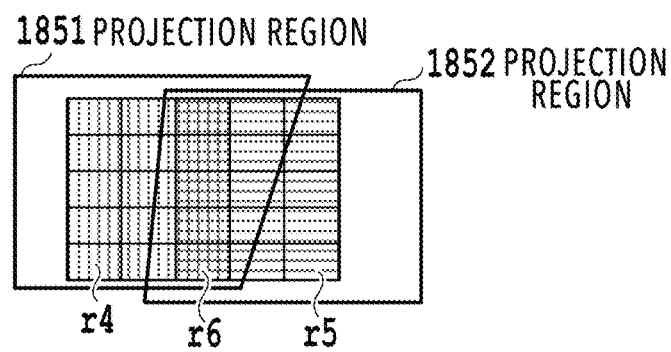

In S2003, the image generation unit 1306 combines the cover regions for the projection devices, determined in S2002, and for each divided region, determines the projection device(s) to handle the projection for the divided region. In FIG. 21D, the image generation unit 1306 determines the vertical-line region r4 as a region to be handled by the projection device 1821, the horizontal-line region r5 as a region to be handled by the projection device 1822, and a grid region r6 as a region to be handled by both of the projection devices 1821 and 1822.

In S2004, the image generation unit 1306 determines the degree of transparency of each divided region determined in S2003 on the basis of the corresponding projection device. Here, the degree of transparency takes a value of 0 to 1, and a degree of transparency of "1" represents complete transparency. The projection device provides the complete transparency by projecting black.

Figure 21E:
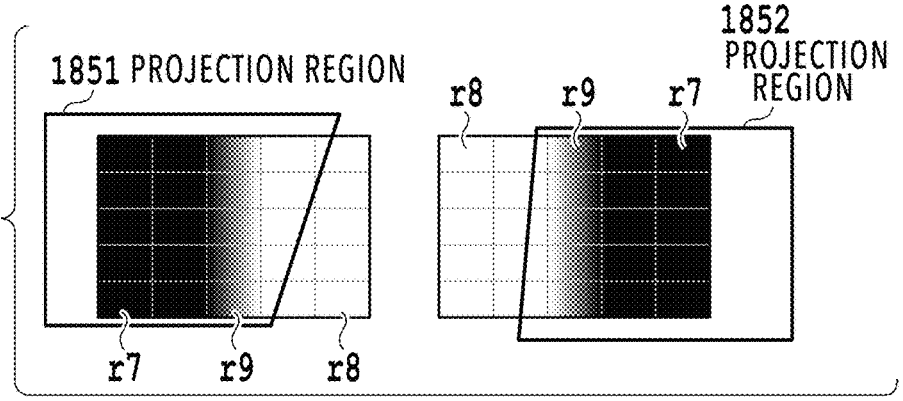

For each projection device, the image generation unit 1306 determines the degree of transparency of each region to be handled by the projection device alone as "0" (black region r7 in FIG. 21E). The image generation unit 1306 determines the degree of transparency of each region not to be handled by the projection device as "1" (white region r8 in FIG. 21E). The image generation unit 1306 determines the degree of transparency of each region to be handled by the plurality of projection devices (gradation region r9 in FIG. 21E) as follows. The image generation unit 1306 determines the degree of transparency at the end closer to the regions to be handled by the projection device alone as "0", and determines the degree of transparency at the end closer to the regions not to be handled by the projection device as "1". Moreover, the image generation unit 1306 determines the degree of transparency between these ends by linear interpolation.

As for the projection region 1851 of the projection device 1821, the vertical-line region r4, the horizontal-line region r5, and the grid region r6 in FIG. 21D correspond to the black region r7, the white region r8, and the gradation region r9 in FIG. 21E, respectively. Similarly, as for the projection region 1852 of the projection device 1822, the vertical-line region r4, the horizontal-line region r5, and the grid region r6 in FIG. 21D correspond to the white region r8, the black region r7, and the gradation region r9 in FIG. 21E, respectively.

Referring back to FIG. 20 to resume the description, in S2005, the image generation unit 1306 generates image data to be projected. The image generation unit 1306 transforms the projection content image data to generate transformed image data, as in embodiment 3. In doing so, the image generation unit 1306 generates transformed image data reflecting the degrees of transparency determined in S2004. Each pixel value I'(x) of the transformed image data thus generated is determined as described in equation 8.

$$I'(x) = (1 - \text{Degree of transparency}) \times I(x) \quad \text{(Equation 8)}$$

where I(x) denotes color information at a pixel position x.

By projecting projection images corresponding to the pieces of transformed image data for the plurality of projection devices thus generated, the images are projected without noticeable boundaries between the projection regions. Also, the resolution of the projection image is high as compared a case where a single projection device is used for projection.

Note that the blending process is not limited to the above example. The degree of transparency may take one of two values of "0" and "1" or one of three values of "0", "1", and "0.5". Also, in the method described, the degree of transparency is determined for each divided region. However, the degree of transparency may be determined for each pixel. Also, the present embodiment has been described taking as an example a mode in which the content image on the print product 1240 and the projection content image for each projection device are the same. However, the content image on the print product 1240 and the content image for each projection device may be different from each other. Moreover, the content images for the plurality of projection devices may be different from each other.

As described above, in the present embodiment, even in the case of using a plurality of projection devices, the positional relation between a print product and each projection device is determined by using an image capture device. This enables automatic generation of projection images to be projected and superimposed that are positioned relative to the print product. Also, using a plurality of projection devices improves the apparent resolution of the projection image. Moreover, performing the blending process on the overlapping region in the projection image reduces the abrupt changes in luminance at the boundaries on the overlapping region and therefore makes the boundaries unnoticeable.

<Modification>

In the example described in embodiment 4, a plurality of projection devices are disposed such that their projection regions have an overlapping region, and a blending process is performed on the overlapping region so that the overlapping region can have the same luminance as the non-overlapping regions, to thereby improve the apparent resolution of the projection image. However, the above is not the only projection method using a plurality of projection devices.

Figure 22:
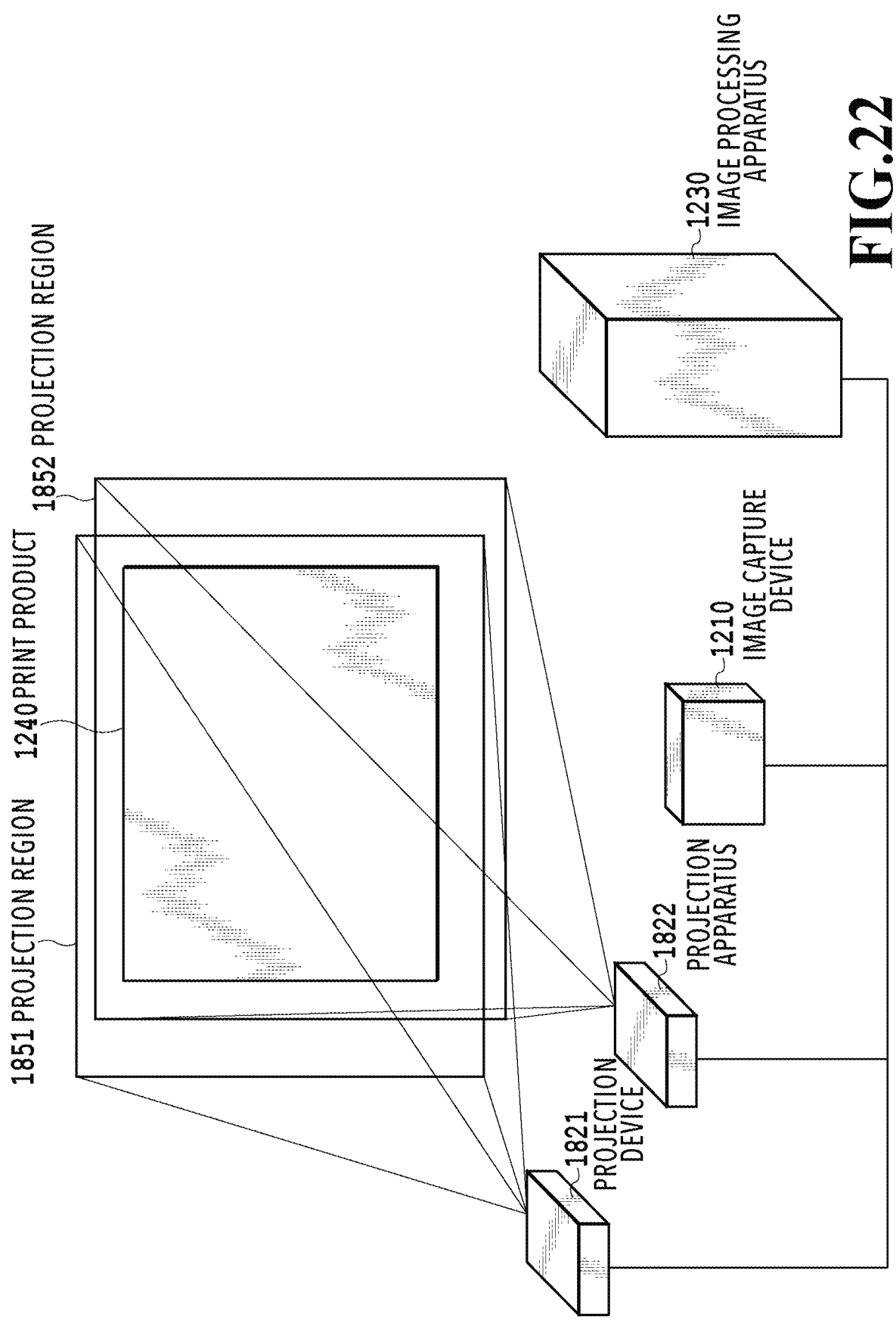
FIG. 22 is a diagram explaining an overview of an image projection system.

FIG. 22 is a diagram illustrating an example of the configuration of an image projection system in a modification of embodiment 4. In the example of FIG. 22, the projection device 1821 and the projection device 1822 are installed such that the projection region 1851 of the projection device 1821 and the projection region 1852 of the projection device 1822 overlap each other substantially entirely. Each projection region is projected so as to include the print product 1240. With the projection regions overlapping each other substantially entirely as mentioned above, the dynamic range can be improved. In the example of FIG. 22, the luminance can be linearly increased by causing the plurality of projection devices to project the same projection content image. Alternatively, the projection content images for the projection devices may be prepared such that one projection device performs projection for relatively dark regions while the other projection device performs projection for lighter regions.

Embodiment 5

In the present embodiment, a description will be given of a mode in which a video is projected and superimposed onto a print product to add a motion to the print product. In the mode to be described below, a similar configuration to that of the image projection system in embodiment 3 is used. Note that the print product in the present embodiment may be the image of a single frame in the video, the medians of the values of the pixels in all frames in the video, or the smallest values of the values of the pixels in all frames. The print product does not have to be associated with the video as long as the content image data of the print product and the video have the same resolution. The configuration of the image projection system in the present embodiment is similar to that in embodiment 3, and description thereof is therefore omitted.

<Flowchart>

Figure 23:
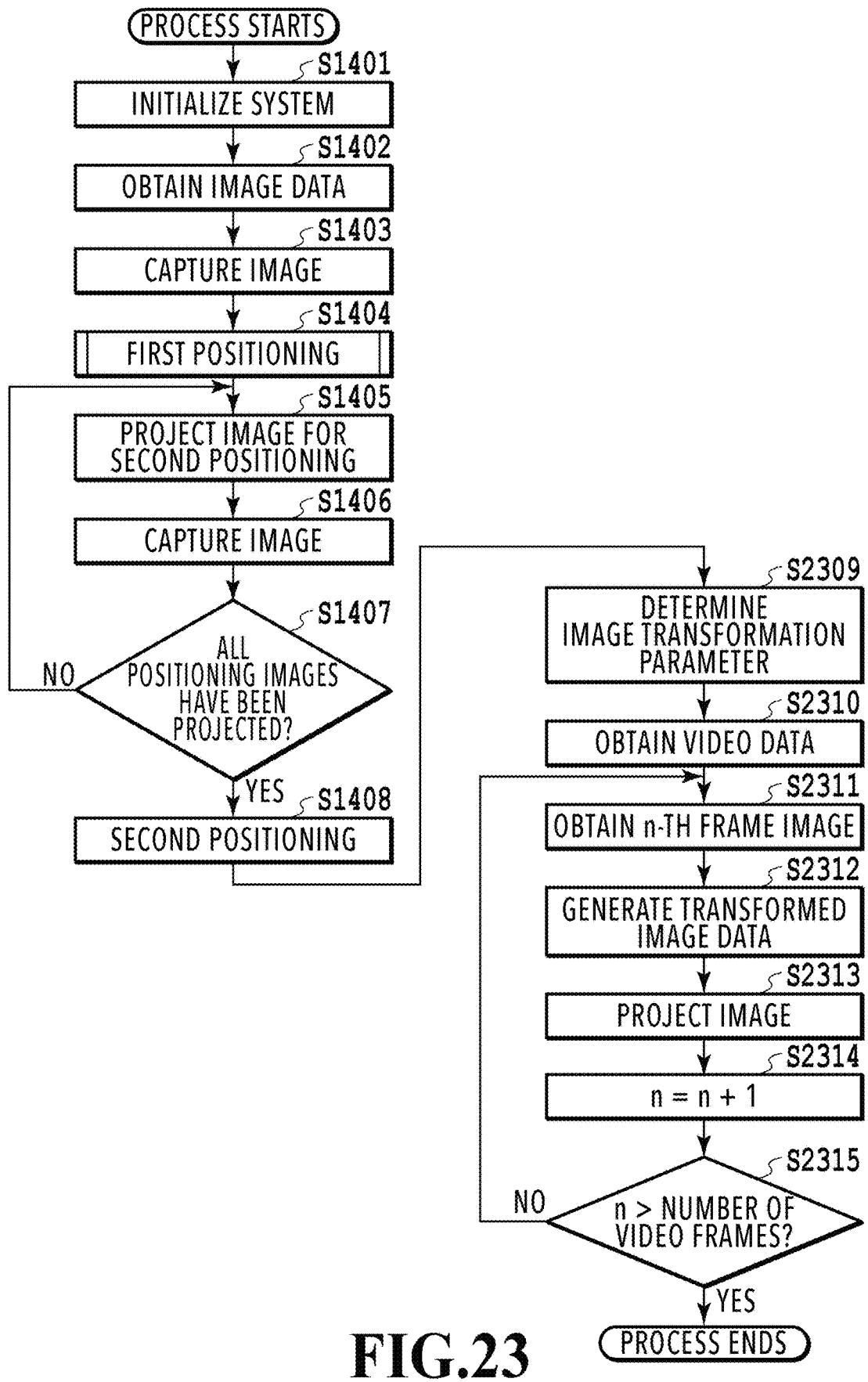
FIG. 23 is a flowchart of a process by the image projection system.

FIG. 23 is a flowchart illustrating a procedure of the process by the image projection system in the present embodiment. Note that processes similar to those in embodiment 3 illustrated in FIG. 14 are denoted by the identical step numbers, and description thereof is omitted. The processes in embodiments 3 and 5 are the same up to S1408. Specifically, the process of determining the positional relation between the print product and the image capture device and the process of determining the positional relation between the projection device and the image capture device are the same as those in embodiment 3.

In S2309, the control unit 1310 controls the image generation unit 1306 to determine the transformation parameter for the projection content image as described in equation 7, as in S1409 in embodiment 3. In S2310, the control unit 1310 obtains video data, which is the projection content, from the storage unit 303. Here, it suffices that S2310 is performed before S2311, and it may be performed in the initialization process in S1401.

In S2311, the control unit 1310 obtains the frame image of the n-th frame in the video data obtained in S2310. The initial value of n is set within the number of frames in the video when the initialization process in S1401 is performed or when the video data is obtained in S2310.

In S2312, the control unit 1310 controls the image generation unit 1306 to transform the image of the n-th frame in the video data obtained in S3110 on the basis of the transformation parameter determined in S2309 to thereby generate transformed image data. In S2313, the control unit 1310 controls the projection device 1220 to project a projection image corresponding to the transformed image data generated in S2312 toward the print product 1240.

In S2314, the control unit 1310 changes n to the next frame number. In the mode described here, a projection content image is projected at intervals of one frame, but the projection intervals are not limited to the above. A projection content image may be projected at intervals of several frames. In S2315, the control unit 1310 determines whether n is more than the number of frames in the video. If n is less than or equal to the number of frames in the video, the flow returns to S2311, and the processes for the n-th frame are performed. If n is more than the number of frames in the video, the process is terminated. Meanwhile, instead of terminating the process, the frame may be returned to the first one in the video and the process may be repeated.

As discussed above, according to the present embodiment, the positional relation between a print product and a projection device is determined by using an image capture device. This enables automatic generation of projection images that are positioned relative to the print product and to be projected and superimposed onto it. By superimposing a video onto a print product, it is possible to impart an impression that adds a motion to the print product. Note that, as described in embodiment 4, it is possible to employ a mode in which a plurality of projection devices are used to project projection contents in a video.

Other Embodiments

Each of the above embodiments has been described taking as an example a case where the projection target object is a print product. However, the projection target object does not have to be a print product. The projection target object may only need to be such that content image data corresponding to the projection target object is obtainable. For example, the projection target object may be a painting with a design or a pattern or a fabric product such as a curtain or a piece of clothing. Also, although each embodiment has been described taking as an example a mode in which the content image data of the print product is stored in the storage unit 303, the present invention is not limited to this mode. For example, it is possible to employ a mode in which the content image data of the print product is obtained from captured image data obtained by capturing an image of the printing product. Also, the image capture device may only need to be such that the correspondence between captured image data of the print product captured by the image capture device and image data of the print product is obtainable. The image capture device may be a color camera, a monochrome camera, an infrared camera, or an RGBD camera, which is capable of obtaining depth.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-100808 filed May 25, 2018, and No. 2018-100809 filed May 25, 2018, which are hereby incorporated by reference in their entirety.

What is claimed is:

1. An image processing apparatus for processing an image of a projection content to be projected from a projection device onto a projection target object including a pattern or a figure in a part thereof, comprising:
   one or more processors; and
   a memory including instructions that, when executed by the one or more processors, cause the image processing apparatus to:
   perform positioning of the image of the projection content and the projection target object with respect to each other;
   transform the image of the projection content on a basis of a result of the positioning; and
   output the transformed image to the projection device,
   wherein the instructions, when executed by the one or more processors, further cause the image processing apparatus, to perform positioning of the image, to:
      obtain image data captured by an image capture device installed so as to capture an image of a region in the projection target object including a projection region;
      determine a positional relation between the projection target object and the image capture device on a basis of image data of the projection target object and the captured image data; and
      determine a positional relation between the image capture device and the projection device on a basis of a positioning pattern projected from the projection device onto the projection target object and image data of the positioning pattern captured by the image capture device, and wherein the image data of the projection target object and image data of the image of the projection content before being transformed are pieces of image data of a same resolution.

2. The image processing apparatus according to claim 1, further comprising a clipping unit configured to clip an image of a projection region in the image of the projection content transformed by the transformation unit, the projection region being a region to be projected by the projection device onto the projection target object, wherein the output unit outputs the clipped image to the projection device.

3. The image processing apparatus according to claim 2, wherein the clipping unit determines a region equivalent to resolution of the projection device as the projection region.

4. The image processing apparatus according to claim 2, wherein the transformation unit transforms a partial image of a region in the image of the projection content, the region corresponding to the projection region.

5. The image processing apparatus according to claim 4, wherein the partial image is an image of a region obtained by converting the projection region in a coordinate system of the projection device into a region in a coordinate system of the image of the projection content, and partially expanding the region resulting from the conversion.

6. The image processing apparatus according to claim 1, wherein the image of the projection content is an image associated with an image in the projection target object.

7. The image processing apparatus according to claim 1, wherein
the positional relation at each of regions into which the image data of the projection target object is divided, is determined by using an image feature point in the region, and
on a basis of the positional relation at each region, a corresponding region in the image of the projection content is transformed.

8. The image processing apparatus according to claim 1, wherein the control unit comprises:
an obtaining unit configured to obtain image data captured by an image capture device installed so as to capture an image of a region in the projection target object including the projection region;
a first positioning unit configured to determine a positional relation between the projection target object and the image capture device on a basis of a three-dimensional shape model of the projection target object and the captured image data; and
a second positioning unit configured to determine a positional relation between the image capture device and the projection device on a basis of the captured image data, an intrinsic parameter of the image capture device, and an intrinsic parameter of the projection device.

9. The image processing apparatus according to claim 1, wherein in a case where there are a plurality of projection devices, the positional relation is transformed for each of the plurality of projection devices.

10. The image processing apparatus according to claim 1, wherein the captured image data used in determining the positional relation between the projection target object and the image capture device and the captured image data used in determining the positional relation between the image capture device and the projection device are pieces of image data captured by the image capture device, installed at a predetermined position, by using a same angle of view.

11. The image processing apparatus according to claim 10, wherein each of the images for a plurality of projection devices is generated such that a degree of transparency of a region at which projection regions of the projection devices overlap each other is changed on a basis of the result of the positioning.

12. The image processing apparatus according to claim 1, wherein the projection target object is a print product with an image printed thereon.

13. The image processing apparatus according to claim 1, wherein an outer frame is added as an image to first image data corresponding to the image on a print product, and the positioning is performed by using the first image data with the outer frame added thereto.

14. The image processing apparatus according to claim 13, wherein a resolution of the first image data is increased by a size of the outer frame to be added.

15. The image processing apparatus according to claim 1, wherein in a case where there are a plurality of the projection devices, the transformation unit transforms and generates each of images for the respective projection devices.

16. The image processing apparatus according to claim 1, wherein the image outputted by the output unit is an image obtained by transforming an image of a frame in a video.

17. An image processing method of processing an image of a projection content to be projected from a projection device onto a projection target object including a pattern or a figure in a part thereof, comprising:
performing positioning of the image of the projection content and the projection target object with respect to each other;
transforming the image of the projection content on a basis of a result of the positioning in the performing; and
outputting the image transformed in the transforming to the projection device,
wherein the positioning includes:
obtaining image data captured by an image capture device installed so as to capture an image of a region in the projection target object including a projection region;
determining a positional relation between the projection target object and the image capture device on a basis of image data of the projection target object and the captured image data; and
determining a positional relation between the image capture device and the projection device on a basis of a positioning pattern projected from the projection device onto the projection target object and image data of the positioning pattern captured by the image capture device, and
wherein the image data of the projection target object and image data of the image of the projection content before being transformed by the transforming are pieces of image data of a same resolution.

18. A non-transitory computer readable storage medium storing a program which performs an image processing method of processing an image of a projection content to be projected from a projection device onto a projection target object including a pattern or a figure in a part thereof, the method comprising:
performing positioning of the image of the projection content and the projection target object with respect to each other;

transforming the image of the projection content on a basis of a result of the positioning in the performing; and outputting the image transformed in the transforming to the projection device, wherein the positioning includes:
- obtaining image data captured by an image capture device installed so as to capture an image of a region in the projection target object including a projection region;
- determining a positional relation between the projection target object and the image capture device on a basis of image data of the projection target object and the captured image data; and
- determining a positional relation between the image capture device and the projection device on a basis of a positioning pattern projected from the projection device onto the projection target object and image data of the positioning pattern captured by the image capture device, wherein the image data of the projection target object and image data of the image of the projection content before being transformed by the transforming are pieces of image data of a same resolution.

* * * * *